United States Patent [19]

Billings

[11] Patent Number: 4,714,989

[45] Date of Patent: Dec. 22, 1987

[54] FUNTIONALLY STRUCTURED DISTRIBUTED DATA PROCESSING SYSTEM

[76] Inventor: Roger E. Billings, 3420 Pink Hill Cir., Blue Springs, Mo. 64015

[21] Appl. No.: 921,219

[22] Filed: Oct. 20, 1986

Related U.S. Application Data

[63] Continuation of Ser. No. 826,721, Feb. 6, 1986, abandoned, which is a continuation of Ser. No. 350,159, Feb. 19, 1982, abandoned.

[51] Int. Cl.⁴ .............................................. G06F 15/16
[52] U.S. Cl. .................................................... 364/200
[58] Field of Search ......................... 364/200 MS File

[56] References Cited

U.S. PATENT DOCUMENTS

| | | | |
|---|---|---|---|
| 3,564,509 | 2/1971 | Perkins | 364/200 |
| 4,204,208 | 5/1980 | McCarthy | 364/900 |
| 4,209,784 | 6/1980 | Sumner et al. | 340/711 |
| 4,266,271 | 5/1981 | Chamoff et al. | 364/200 |
| 4,287,567 | 9/1981 | Lumsden | 364/900 |
| 4,319,326 | 3/1982 | Uchida | 364/900 X |
| 4,319,336 | 3/1982 | Anderson et al. | 364/900 |
| 4,321,672 | 3/1982 | Braun et al. | 364/900 X |
| 4,355,369 | 10/1982 | Garvin | 364/900 |
| 4,414,621 | 11/1983 | Brown et al. | 364/200 |
| 4,432,057 | 2/1984 | Daniell et al. | 364/200 X |
| 4,439,837 | 3/1984 | Aiena et al. | 364/900 |
| 4,476,528 | 10/1984 | Matsumoto et al. | 364/200 |
| 4,481,574 | 11/1984 | De Fino et al. | 364/200 |

*Primary Examiner*—Raulfe B. Zache
*Attorney, Agent, or Firm*—Litman, McMahon & Brown

[57] ABSTRACT

A functionally structured distributed data processing system includes a plurality of independently operating user station processors for servicing users, a data center for storing data to be processed by the user stations, and a communication network for coupling each user station to one or more data centers. The data center includes its own processor and mass storage devices for managing a data base of data for the user stations. Each user station executes application programs to which is linked a data base simulator which formulates requests or data operations to calls to the data base at the data center. Communications between the user stations and the data center are usually initiated only by the user stations.

14 Claims, 2 Drawing Figures

FUNTIONALLY STRUCTURED DISTRIBUTED DATA PROCESSING SYSTEM

CROSS-REFERENCE TO RELATED APPLICATIONS

The present invention is a continuation of Ser. No. 826,721 for FUNCTIONALLY STRUCTURED DISTRIBUTED DATA PROCESSING SYSTEM filed Feb. 6, 1986, and now abandoned which was a continuation of Ser. No. 350,159 for DISTRIBUTED DATA PROCESSING SYSTEM filed Feb. 19, 1982, and now abandoned.

FIELD OF THE INVENTION

The present invention relates to distributed data processing systems and, more particularly, to such a system including a data center computer managing data bases for a plurality of independently operating user station computers which process their own data and which store and retrieve data items related thereto in the data bases of the data center computer by communicating data base calls to the data center computer.

BACKGROUND OF THE INVENTION

Data processing systems in common use today generally include a large main frame computer having a plurality of input/output terminals by which users communicate with the computer. The main frame computer serves to manipulate data, perform calculations, etc., pursuant to applications programs, and store and retrieve data either for use in the manipulation, calculations, etc., or simply for delivery to one of the terminals. Although such a conventional arrangement provides significant computing power and access by numerous user terminals, the main frame computer necessary for servicing the terminals and providing the data processing capabilities is large, complex, and costly. Further, the computing power of such systems, although significant, generally cannot be increased except by provision of an entire new system.

It has been suggested that dividing up the data processing task and distributing it among more than one central processing unit would provide certain economies and advantages not achievable with the use of a single, large main frame central processing unit. (See, e.g., publication A20-710-101, "Evolving Office of the Future", January 1980, by Datapro Research Corp.) An example of one such advantage is to allow for piecewise growth of a small system into a larger system as needs increase, rather than starting out with a full-blown large scale system initially. Typically, the various central processing units for use in a distributed data processing system have the capability of communicating with one another, and, in fact, to achieve full processing capability, it is generally essential in such systems to provide for communication among the various central processing units. However, implementation of the capability of inter-processor communication results in a sacrifice of some of the economies and simplicity which was desired in proposing the distributed data processing system. This is because of the increased complexity of programming each central processing unit to not only store, retrieve and process data, but also initiate, respond to, and monitor inter-processor communication requests. That is, a significant part of each central processing unit's operation time (and operating system) is taken up in simply accommodating communication with the other central processing units. This difficulty becomes more severe each time another processor is added to the system. Also, any change in the programming of one central processing unit or its associated storage files generally requires changes in the programming or associated data files of the other related central processing units. Thus far, there have been no distributed data processing configuration offered which would provide the apparent advantages of distributed data processing without the attendant problems.

SUMMARY OF THE INVENTION

The present invention grows out of and is founded upon the unique premise that computer operations can be broken down into two basic categories or functions—(1) servicing a user by receiving input information, operating upon information, and supplying information to the user (this function is hereinafter referred to as the user station function), and (2) storing and retrieving information from information storage equipment. (This function is hereinafter referred to as the data center function.) In the system of the present invention, these two basic functions are segregated in a way which accommodates simplified planning and implementation of large multi-user distributed data processing systems at a far lower cost and complexity than heretofore thought possible, and with more flexibility and adaptability to growth in both capacity (number of users serviced and amount of data processed) and capability (kinds of data processing which can be performed). The segregation is carried out by dedicating or assigning each central processing unit to one of the above two functions or classifications of computer operations. Thus, the system of the present invention includes a plurality of user stations each dedicated to servicing a user (which could be a person, another device, or machine) and each functioning as a stand-alone computer, having its own central processing unit, typically a microprocessor, and equipment by which the user can communicate with the central processing unit, typically a video display and keyboard terminal. The user stations may have other peripheral equipment as well, such as disk drives, printers, card readers, or the like. The user stations service the users by executing application programs supplied by the users.

The system of the present invention also includes one or more data centers dedicated to the storage and retrieval of data which may be required by two or more user stations, or, in some instances, of data which is required by only one user station but which is more economically stored at the data center. Each data center includes its own central processing unit, mass storage unit such as a hard disk drive, and a data access control program. The data access control programs are essentially the same for all data centers in a system for reasons which will become apparent. The data center functions to respond to inquiries from the user stations to either receive and store data supplied by a user station or retrieve previously stored data and supply it to a user station, all under the control of the data access control program.

The system operates pursuant to certain rules of interaction or specifications which greatly simplify the implementation of the system, without restricting its flexibility or adaptability for growth. Pursuant to these rules, usually only a user station may initiate communication between the user station and the data center, and there is normally no communication directly between user stations or between data centers. In operation, a user station initiates contact (inquires) with a data center using any of a variety of conventional protocol procedures, and the data center, which is always operating in an access mode under control of a data access control program, responds to the inquiry and communication is established. The user station communicates a request to the data center's data access control program either to store data supplied or to retrieve already stored data. The data center's data access control program then carries out the request by either storing supplied data in a mass storage or retrieving data and sending it to the user station.

Because of the segregation of functions and the implementation of the rules of interaction, the programming of the user stations is greatly simplified. The user station programs need not accommodate instructions for communicating with other user stations and, because the data center's data access control programs are essentially the same, one set of user station application program techniques is suitable for communicating with any of the data centers. The data center access control program need not accommodate instructions for interfacing directly with other data centers, for carrying out application data processing, or for initiating contact with user stations, and thus is greatly simplified.

In a preferred embodiment of the present invention, the data center computer manages data bases for the independently operating user computers by means of a data base manager program. The user computers store, retrieve, and update data items in their data bases by communicating data base calls to the data center computer. The user computers run respective user application programs to process their data and to each of which is linked a data base simulator program. When a user application program reaches a point in processing at which a data operation on a data item is needed, the user application program calls the data base simulator program and supplies it with sufficient information to issue a data base call to the data center computer to perform the required data operation. The data access control program of the data center computer, of which the data base manager is a component, controls the access of users to the data bases such that users can maintain data bases not accessible to other users.

OBJECTS OF THE INVENTION

The principal objects of the present invention are: to provide a new and improved distributed data processing system which is simple in design, easy and inexpensive to implement, and structured according to the functions to be performed; to provide such a system which readily accommodates expansion without a corresponding increase in complexity; to provide such a system wherein the throughput of the system can be selectively increased as desired by the user; to provide such a system wherein modifications may be made in one part of the system without requiring significant changes in other parts of the system; to provide such a system which is suitable for handling a variety of data processing needs; to provide such a system in which failure in one part of the system will not obviate use of the entire system; and to provide such a system which is economical to manufacture and maintain and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
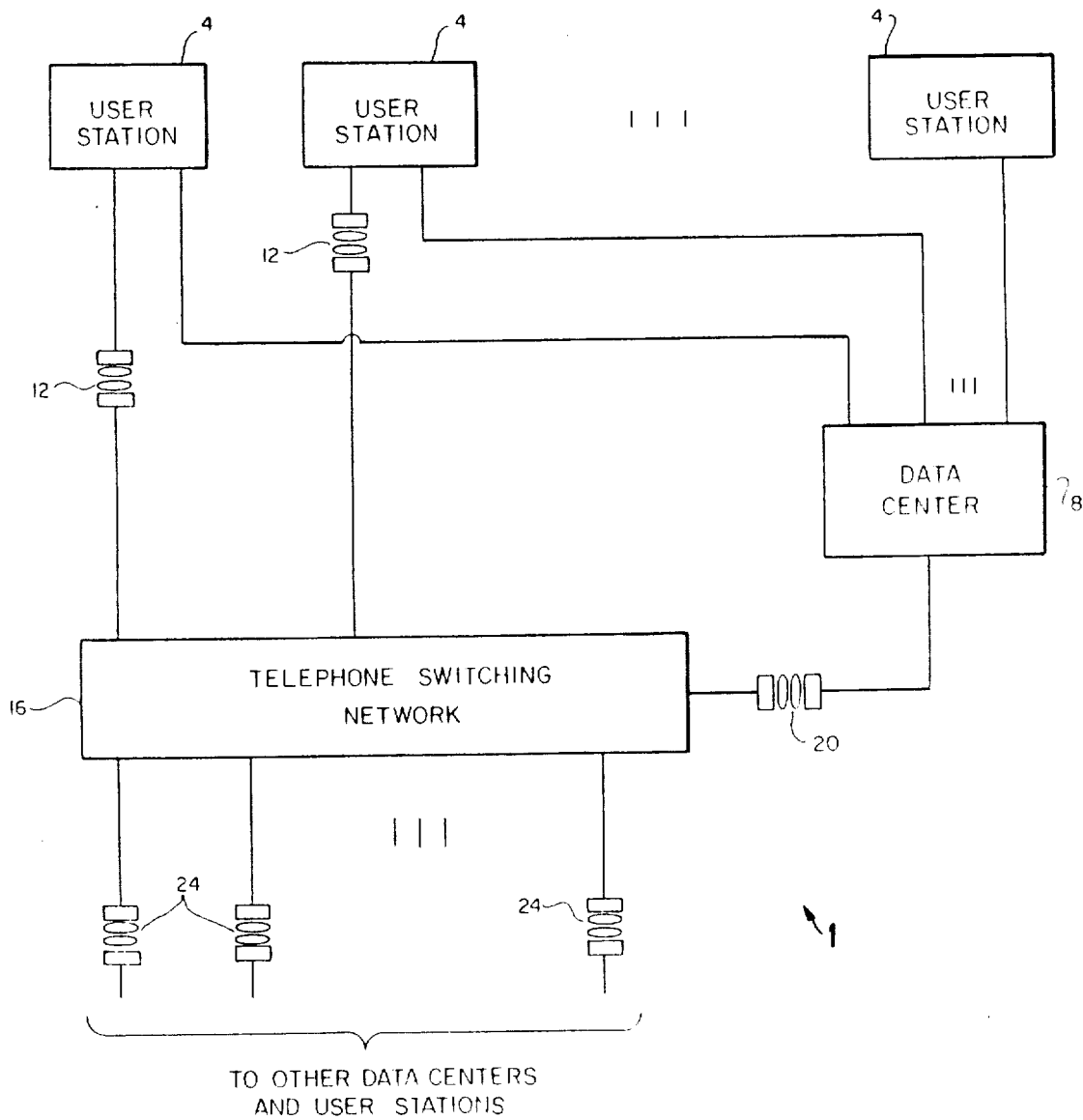
FIG. 1 is a block diagram illustrating a distributed data processing system made in accordance with the principles of the present invention.

Referring to FIG. 1, there is shown a specific illustrative embodiment of a distributed data processing system 1 made in accordance with the present invention. The system includes a plurality of user stations 4 for interfacing with and carrying out the processing needs of users, with the user stations being coupled directly to a data center 8 for storing data of common interest to the user stations. Two of the user stations 4 are also coupled by way of modems 12 to a switching network 16 which could, for example, be the Bell System telephone switching network. The data center 8 is also coupled by way of a modem 20 to the switching network 16. Other user stations and data centers are also connected to the switching network 16 by way of modems 24 so that such user stations can connect to the data center 8 and so that the user stations 4 can connect to such data centers. The modems 12, 20 and 24 are conventional modulator/demodulators for enabling transmission of data over the switching network 16. The switching network 16, in addition to being the Bell System telephone network, could also be a private network used to interconnect user stations with data centers, a packet (message) switched network, etc.

In accordance with the present invention, the system of FIG. 1 is designed to operate according to certain "rules of interaction" which serve to reduce the complexity of the system, without reducing its flexibility and adaptability to growth. These rules specify that usually a user station initiate communication between the user station and a data center, and that there be no direct communication between user stations or between data centers in normal applications. These rules may be implemented in the system of FIG. 1 either by hardware design or by appropriate programming. In the former case, no direct communication links between user stations 4 or between the data center 8 and any other data center are necessary, and the switching network 16 could be designed so that no wire path between user stations or between data centers would be required. If the rules were implemented by programming, then each user station 4 would include instructions and addresses enabling connection of the user station only to data centers, while the data center programs would usually contain no instructions whatever for allowing connection to another data center or for initiating a connection with a user station. The rules of interaction also require that the data center 8 and any other data centers continually operate in an access mode—a mode in which the data centers are conditioned to respond to any "request" which may be received from any user station.

Each user station 4 is equipped to service a user by receiving input information, operating upon or processing such information, and supplying information to the user. Each user station 4 is also equipped to request service of at least one of the data centers, establish communication therewith, and supply data to and receive data from the data centers. Each data center 8 is equipped to respond to requests for service from the user stations, receive data from user stations and store such data in mass storage, and retrieve data from mass storage and supply it to requesting user stations. These functions are carried out by providing each user station 4 and each data center with its own central processing unit as will be discussed in greater detail hereafter.

Figure 2:
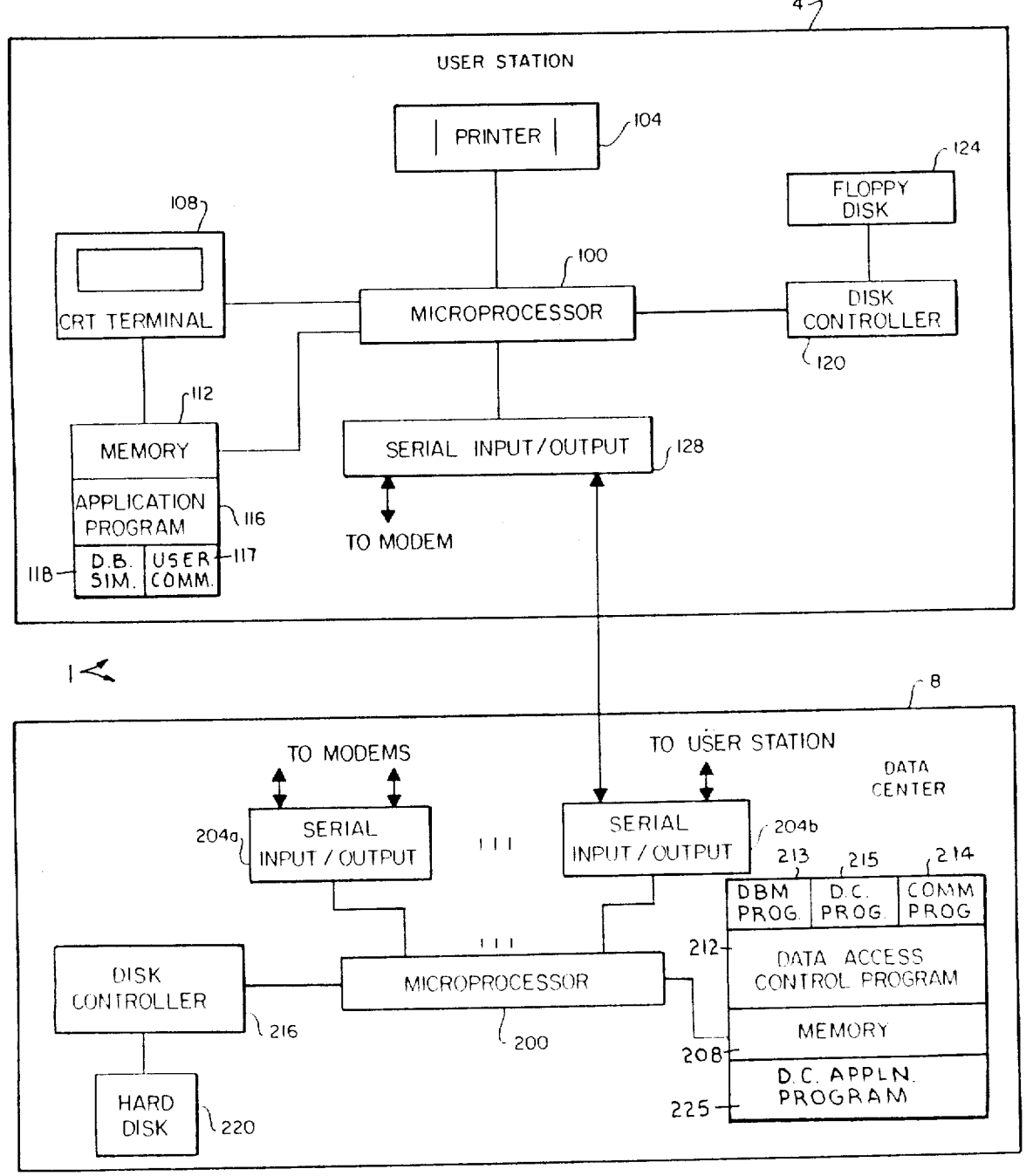
FIG. 2 is a block diagram illustrating further details of a user station and a data center which can be used in the system of the present invention.

FIG. 2 shows specific illustrative embodiments of a user station 4 and a data center 8 connected by a direct link. The user station 4 includes a microprocessor 100, which could be any conventional microprocesor currently available on the market such as the Zilog Z-80 microprocessor. Coupled to the microprocessor 100 is a conventional hard copy printer 104 for receiving data from the microprocessor 100 and for printing such data for use by a user, a conventional cathode ray tube terminal 108 having a keyboard by which information may be communicated to the microprocessor and a screen for displaying information either typed on the keyboard or received from the microprocessor, and a main memory 112, such as a random access memory (RAM), for temporarily storing data to be processed by the microprocessor and application program instructions 116 which are to be executed by the microprocessor. Also coupled to the microprocessor 100 is a conventional floppy disk controller 120 (such as Western Digital 1791 controller) which, in turn, is coupled to a conventional floppy disk drive 124. Other peripheral units such as card readers, hard disk drives, etc., could also be coupled to the microprocessor 100.

In order to communicate with a data center, the user station 4 includes a serial input/output device 128 having two ports, one of which is used for coupling the user station directly to the data center 8 and the other of which may be used to connect the user station to a modem and from there to the switching network 16 (FIG. 1.) An exemplary serial input/output device suitable for use as the device 128 in the user station 4 is the Zilog Z-80 SIO.

The data center 8 includes a microprocessor 200 coupled to a plurality of serial input/output ports 204. These ports, which again could be driven by the Zilog Z-80 SIO, enable the data center 8 to communicate either directly to user stations or via modems to the switching network 16 (FIG. 1) so that the data center 8 may service a number of user stations essentially simultaneously. The data center 8 also includes a main memory 208 for temporarily storing data and programs to be executed by the microprocessor 200. In particular, the main memory 208 would store a data access control program 212 for controlling the microprocessor 200 to respond to requests from user stations by storing data in or retrieving data from a mass storage device such as a hard disk drive 220 coupled by way of a disk controller 216 to the microprocessor.

Although specific equipments are shown for the user station 4 and data center 8 of FIG. 2, it should be understood that a variety of configurations could be utilized to enable the user station 4 to operate as an interface with users and to process application programs 116, and to enable the data center 8 to serve as a storage and retrieval center for data of common interest to the user stations. Illustratively, the user station 4 would be utilized to interact with the operator, generate payroll information, produce accounting reports, process accounts payable and accounts receivable, sort, compile, process hotel or airline reservation requests, and in general process data pursuant to a variety of conventional application programs 116. The data centers 8 illustratively would serve to store data relating to the personnel of a company, payroll information regarding such personnel, accounts payable and accounts receivable data, information regarding occupancies and vacancies in a hotel chain or airline system, and generally any type of data which may be of interest to more than one user station 4. As a user station 4 executes an application program 116 and the program reaches a point where stored data is required, the user station initiates communication with the data center 8 so that the appropriate data can be retrieved and transmitted to the requesting user station 4. When the data is received by the user station 4, the user station utilizes the data in the manner directed by the application program 116. Similarly, if a user station 4 in the course of executing an application program 116 needs to store, update, or modify data in the data center 8, it initiates communication with the data center 8 and transmits the data to be stored.

There are a variety of methods by which a user station 4 might establish communication with a data center 8. For one such illustrative method, the data center 8 has stored in its memory 208 a data access control program 212 which includes a conventional data base manager program (D.B.M. Prog.) 213 for controlling the storage and retrieval of data at the data center 8, a communications program (Comm. Prog.) 214 for controlling communication with the user station, and a data center program (D.C. Prog.) 215 for interfacing with the communications program 214 and data base manager 213. The user station 4 similarly has stored in its memory 112 a user communications program (User Comm.) 117 for controlling communication with the data center 8, and a data base simulator program (D.B. Sim.) 118 which interfaces with the communications program 117 and whatever application program 116 is being executed by the user station. The data base simulator program 118 is somewhat similar in operation to a data base manager and enables an application program 116 at the user station to call for storage or retrieval of data from the data center as though it were calling for data from a data base resident at the user station 4.

The use of the data base manager program 213 at the data center 8 and the data base simulator program 118 at the user stations 4 provides an inherent and heretofore unprecedented level of data security in distributed data processing systems since typical data base management systems are accessed by data base calls, that is, high-level compiler-like languages that are used to describe the location, contents, relationships, and security level of data that are stored in the data center 8. Since communications from the user stations 4 to the data center 8 in the preferred embodiment are exclusively in the form of data base calls, accesses to the operating system utilities of the data center 8 are inherently precluded. If the data access control program 212 in its protocol check determines that a received communication is other than a call to the data base manager program 213, access will be denied. Further, the data access control program 212 may perform additional security checks to prevent user stations 4 from accessing data bases other than their own or those that the particular user stations 4 have specific authorization to access.

When an application program 116 being executed at the user station 4 reaches a point where stored data is needed or where it is necessary to store (or update or modify) data, the application program 116 calls the data base simulator program 118 and identifies what action is to be taken and the record location in the data center where data is to be stored or from which data is to be retrieved. The data base simulator program 118 automatically passes this information to the communications program 117. The communications program 117 responds by adding appropriate communication protocol to this information or message such as sync characters, error checking characters, etc., and generally prepares the message for transmittal. The communications program 117 then supplies the message to the serial input/output device 128 which transmits it to the data center 8.

At the data center 8, the serial input/output device 204b receives the transmitted message and interrupts the data center communications program 214 which operates continually in an access mode in the data center. The communications program 214 checks the protocol and, if the protocol is in order indicating that the message is permitted one and was correctly received, the communications program 214 causes transmittal of an acknowledgment signal to the user station 4. If the protocol is not in order, the communications program 214 causes transmittal of signals to the user station 4 to indicate the problem and cause retransmittal of the message. Assuming the protocol is in order, the communications program 214 calls the data center program 215 which determines whether the requested action is allowable. If the request is allowable, the data center program 215 then calls the data base manager 213 and links therewith. The data base manager 213 responds by carrying out the action called for in the received message—either storing data in the identified file in the hard disk drive 220 or retrieving data therefrom. After the action is performed, the data base manager 213 passes a response to the data center program 215—a verification if data was stored, or the data retrieved if that occurred. The data center program 215 calls the communication program 214 which then adds appropriate communication protocol to the response and supplies the response to the serial input/output device 204b for transmittal to the user station. In this manner, communication between a user station and data center may be established, and data exchanged.

With the distributed data processing system 1 of the present invention, a plurality of users may be serviced in a simple, efficient and inexpensive fashion. Although specific illustrative embodiments have been described, it should be understood that the invention is not limited to these embodiments. For example, the invention contemplates and encompasses a data center multiprocessing system where a portion of the multiprocessor is dedicated to servicing the data storage needs of not only remote user stations 4, but also resident data center application programs 225. Also, although the distributed data processing system 1 was described to prohibit communication between user stations 4, some nominal provision for such communication on a limited basis would not be considered a departure from the present invention. Finally, it is considered within the skill of the art to provide detailed programs for implementing the invention in a variety of specific alternative embodiments and the appended claims are intended to cover all such alternative embodiments or arrangements.

Therefore, it is to be understood that while certain forms of the present invention have been illustrated and described herein, it is not to be limited to the specific forms or arrangement of parts described and shown.

What is claimed and desired to be secured by Letters Patent is as follows:

1. A method of operating a distributed data processing system including a plurality of independent, not necessarily uniform, general purpose user computers to run respective user application programs to process user data and a data center computer to store, retrieve, and update user data, said user computers being selectively interconnected with said data center computer by respective data communication hardware over data communication network means, said method comprising the steps of:
   (a) managing in a data center computer by means of a data base manager program a user data base of user data items to perform data operations of storing, updating, and retrieving said user data items in response to data base calls for such operations from a user computer;
   (b) running a user application program in a general purpose user computer to process user data, said user application program indirectly issuing data base calls for data operations regarding user data items in response to requirements for said data operations by said user application program;
   (c) in response to a data base call regarding a user data item from a user application program, initiating by said user computer only a data communication link with said data center computer over data communication network means;
   (d) communicating said data base call from said user computer to said data center computer;
   (e) performing by said data center computer said data operation regarding said user data item defined by said data base call; and
   (f) communicating an appropriate response to said data base call from said data center computer to said user computer.

2. A method as set forth in claim 1 including the step of:
   (a) running a data access control program in said data center computer which includes said data base manager program, said data access control program allowing access to selected user data items only by selected user computers.

3. A method as set forth in claim 1 including the step of:
   (a) issuing said data base calls from said user computer by a data base simulator program running in said user computer in cooperation with said application program.

4. A method as set forth in claim 1 wherein said data center computer is a first data center computer and including the steps of:
  (a) providing a plurality of data center computers constructed and operating similar to the first data center computer;
  (b) initiating a data communication link only by a user computer with one of said data center computers to issue a data base call thereto; and
  (c) preventing data communication links between said plurality of data center computers.

5. A method as set forth in claim 1 including the steps of:
  (a) providing said data center computer with a multiprocessor;
  (b) running said data base manager program by operation of one portion of said multiprocessor; and
  (c) running a data center application program by operation of another portion of said multiprocessor.

6. A method of operating a distributed data processing system including a plurality of independent, not necessarily uniform, general purpose user computers to run respective user application programs to process user data and a data center computer to store, retrieve, and update user data, said user computers being selectively interconnected with said data center computer by respective data communication hardware over data communication network means, said method comprising the steps of:
  (a) managing in a data center computer by means of a data base manager program a user data base of user data items to perform data operations of storing, updating, and retrieving said user data items in response to data base calls for such operations from a user computer;
  (b) running a user application program in a general purpose user computer to process user data;
  (c) linking to said user application program a data base simulator program which issues data base calls for data operations regarding user data items in response to requirements for said data operations by said user application program;
  (d) running a data access control program in said data center computer which includes said data base manager program, said data access control program allowing access to selected user data items only by selected user computers;
  (e) in response to a data base call regarding a user data item from a user application program, initiating by said user computer only a data communication link with said data center computer over data communication network means;
  (f) communicating said data base call from said user computer to said data center computer;
  (g) in response to said data base call being received from one of said selected computers and being concerned with at least one of said selected data items, performing by said data center computer said data operations regarding said user data item defined by said data base call; and
  (h) communicating an appropriate response to said data base call from said data center computer to said user computer.

7. A method as set forth in claim 6 wherein said data center computer is a first data center computer and including the steps of:
  (a) providing a plurality of data center computers constructed and operating similar to the first data center computer;
  (b) initiating a data communication link only by a user computer with one of said data center computers to issue a data base call thereto; and
  (c) preventing data communication links between said plurality of data center computers.

8. A method as set forth in claim 6 including the steps of:
  (a) providing said data center computer with a multiprocessor;
  (b) running said data base manager program by operation of one portion of said multiprocessor; and
  (c) running a data center application program by operation of another portion of said multiprocessor.

9. A functionally structured distributed data processing system comprising:
  (a) a data center computer functioning to perform data operations of storing, retrieving, and updating user data items;
  (b) a data base manager program running in said data center computer to manage a user data base of user data items by performing said data operations in response to data base calls thereto regarding user data items;
  (c) a plurality of not necessarily uniform, general purpose user computers operating independently of said data center computer to process user data by running respective user application programs;
  (d) each user application program indirectly issuing a data base call for a data operation regarding a selected data item in response to a requirement for said data operations by said user application program; and
  (e) data communication network means interconnecting said user computers to said data center computer, said data communication network communicating data base calls from said user computers to said data center computer and communicating respective responses to said data base calls from said data center computer to said user computers.

10. A system as set forth in claim 9 including:
  (a) a data access control program running in said data center computer, said data access control program including said data base manager program as a component and allowing access to selected user data items only to selected user computers.

11. A system as set forth in claim 10 wherein:
  (a) said data access control program allows communications between said user computers and said data center computer to be initiated only by one of said user computers.

12. A system as set forth in claim 9 wherein said data center computer is a first data center computer and including:
  (a) a plurality of data center computers constructed and operating similar to the first data center computer;
  (b) each data center computer has running therein a data access control program which allows communications between said user computers and said data center computer to be initiated only by one of said user computers and which prevents data communication links from being established between said data center computers.

13. A system as set forth in claim 9 including:
 (a) a data base simulator program running in each user computer in cooperation with the user application program running therein, said data base simulator program automatically passing said data base calls to the data center in response to said requirements by the associated user application program for said data operations regarding said user data items.

14. A system as set forth in claim 9 including:
 (a) a multiprocessor in said data center computer;
 (b) one portion of said multiprocessor operating to run said data base manager program; and
 (c) another portion of said multiprocessor operating to run a data center application program.

* * * * *

US004714989C1

(12) EX PARTE REEXAMINATION CERTIFICATE (5260th)

United States Patent
Billings

(10) Number: US 4,714,989 C1
(45) Certificate Issued: Jan. 31, 2006

(54) FUNCTIONALLY STRUCTURED DISTRIBUTED DATA PROCESSING SYSTEM

(76) Inventor: Roger E. Billings, 3420 Pink Hill Cir., Blue Springs, MO (US) 64015

Reexamination Request:
No. 90/003,463, Jun. 7, 1994

Reexamination Certificate for:
Patent No.: 4,714,989
Issued: Dec. 22, 1987
Appl. No.: 06/921,219
Filed: Oct. 20, 1986

Related U.S. Application Data

(63) Continuation of application No. 06/826,721, filed on Feb. 6, 1986, now abandoned, which is a continuation of application No. 06/350,159, filed on Feb. 19, 1982, now abandoned.

(51) Int. Cl.
*G06F 15/16* (2006.01)

(52) U.S. Cl. .......................................... 707/10; 709/217
(58) Field of Classification Search ...................... None
See application file for complete search history.

(56) References Cited

U.S. PATENT DOCUMENTS

| | | |
|---|---|---|
| 3,483,520 A | 12/1969 | Broderick et al. |
| 3,845,277 A | 10/1974 | Voss et al. |
| 4,063,220 A | 12/1977 | Metcalfe et al. |
| 4,091,448 A | 5/1978 | Clausing |
| 4,114,027 A | 9/1978 | Slater et al. |
| 4,186,438 A | 1/1980 | Benson et al. |
| 4,204,251 A | 5/1980 | Brudevold |
| 4,212,057 A | 7/1980 | Devlin |
| 4,214,305 A | 7/1980 | Tokita et al. |
| 4,238,853 A | 12/1980 | Ehrsam et al. |
| 4,245,306 A | 1/1981 | Besemer et al. |
| 4,251,858 A | 2/1981 | Cambigue et al. |
| 4,274,139 A | 6/1981 | Hodgkinson et al. |
| 4,320,450 A | 3/1982 | Rose |

FOREIGN PATENT DOCUMENTS

| | | |
|---|---|---|
| JP | 113655 | 9/1977 |
| JP | 185541 | 11/1982 |

OTHER PUBLICATIONS

*Microprocessors and Microcomputer Systems*; $2^{nd}$ Edition, by Guthikonda V. Rao, PhD, 1982, pp. 180–182, Pub by Van Nostrand Reinhold Co Inc.*
"PDP 10 Timesharing Handbook", copyright 1968, 1969, 1970, by Digital Equipment Corporation, pp. 11, 111, Book 1 pp. 1–3 through 1–14.*
L.C. Hobbs, "Terminals", *Proceedings of IEEE,* Nov. 1972, pp. 3–10–3–21.
Robert J. Williams, "The Distributed Intelligence System", 1976.
Hewlett Packard, "Computer Advances", *Datamation,* vol. 8, Jul./Aug. 1978, pp. 28–34.
George A. Champine, "Four Approaches to a Data Base Computer", *Datamation,* Dec. 1978, pp. 101–106.
Olin Bray, Kenneth J. Thurber, "What's Happening with Data Base Processors?" *Datamation,* Jan. 1979, pp. 146–148; 155–156.
Tandem Network Operating System, "Guardian/Expand," *Datamation.*
Pertec Computer Corp., "XL Distributed Processing Systems," *Datamation,* Apr. 1979, p. 27.

(Continued)

*Primary Examiner*—Jean Homere

(57) ABSTRACT

A functionally structured distributed data processing system includes a plurality of independently operating user station processors for servicing users, a data center for storing data to be processed by the user stations, and a communication network for coupling each user station to one or more data centers. The data center includes its own processor and mass storage devices for managing a data base of data for the user stations. Each user station executes application programs to which is linked a data base simulator which formulates requests or data operations to calls to the data base at the data center. Communications between the user stations and the data center are usually initiated only by the user stations.

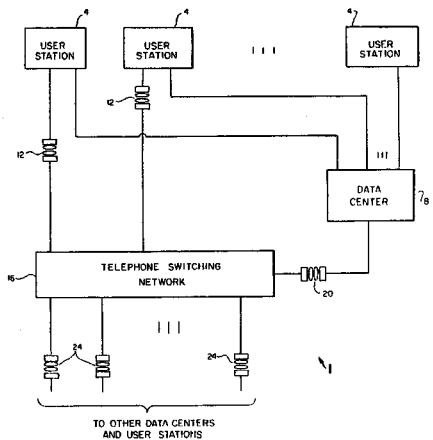

OTHER PUBLICATIONS

Datapoint Corp., "Comparing a Datapoint ARC system to a conventional computer is like comparing apples to oranges," *Datamation*, Apr. 1979, p. 27.

Shelden Linker, "Timesharing: Squeezing the Most from your Micro," *BYTE*, Jun. 1979, pp. 228–233.

Datapoint Corp., "Just as Gold Is a Universal Measure of Economic Value, a Datapoint Arc System Is Business Processing's Standard of Cost–Effectiveness," *Datamation*, Jun. 1979, pp. 97.

Datapoint Corp., "Datapoint will lease you this 420K Computer System for $1,950 a month and ship it in about 12 weeks," *Datamation*, Jul. 1979, pp. 47.

Billings Computer Corp., "Data Byte System 1."

Nestar System Inc., "What's New?" *Datamation*.

M.E. Womble, S.D. Wilson, H.N. Keiser, M.L. Twoek, *Computers and Biomedical Research*, "An Intelligent Terminal for Access to a Medical Data Base," vol. 12, No. 5, Oct. 1979, pp. 471–481.

Ohio Scientific, "Ohio Scientific's OS–65U Level 3 operating system software brings new networking and distributed processing capabilities to microprocessor based computer systems," *BYTE*, 1979.

"The Ultimate Software Tool," Micro Data Base Systems Inc, 1979.

"What's New?" *Datamation*.

A.V. Pohm, J.A. Davis, S. Christiansen, G.D. Bridges, R.E. Horton, "A Local Network of Mini and Microcomputers for Experiment Support," 1979.

Corvus Systems Inc., "Are your needs beyond the reach of your computer?" *BYTE*, Apr. 1980.

H. Sturgis, J. Mitchell, J. Israel, "Issues in the Design and Use of a Distributed File System," *Operating Systems Review*, vol. 14, No. 3, Jul. 1980.

NBI, "NBI Made Word Processing Obsolete Today," Jul. 1980.

"Interactive Software Links HP3000, IBM Mainframe," *BYTE*, Aug. 1980.

Data Node Inc., *Datamation*, Sep. 1980, p. 230.

"CompuStar: Intertec's New S2500 Multi–User Small Business Computer," *Datamation*, Sep. 1980.

Jim McClure, "The C2–4P Ohio Scientific Computer," *Creative Computing*, Oct. 1980, pp. 17–18, 20, 22–23.

Jeremy Dion, "The Cambridge File Server," *Operating Systems Review*, Oct. 1980, vol. 14, No. 4, pp. 26–35.

"The No Problem Typewriter," Lanier Business Products Inc., *Datamation*, Oct. 1980.

"What's New?" *BYTE*, Oct. 1980, p. 345.

Digital Research, "Microcomputer Networking From Digital Research," *BYTE*, Oct. 1980, p. 219.

"DP/Net: Redefined," *BYTE*, Oct. 1980.

Corvus Systems Inc., "Stop Playing Games and Get Down to Business" *BYTE*, Nov. 1980.

Lifeboat Associates, "Now You're Talking!" *BYTE*, Nov. 1980, p. 162.

Compuserve, "All This is Yours to Command," *BYTE*, Dec. 1980.

Phase One Systems Inc., "Multi–user Oasis has the Features Pros Demand," *BYTE*, Dec. 1980.

New England Electronics Co Inc., "CBM 8032 Business Computer," *BYTE*, Dec. 1980.

Digital Research Inc., "What's New?" *BYTE*, Dec. 1980, p. 344.

Thomas Rolander, "CP/Net: Computer Program for a Microcomputer Network," *PC Business Press*, vol. 5, No. 2, Mar. 1981.

Shelley I. Saffer, David J. Mishelevich, Shirley J. Fox, Victor B. Summerour, "NODAS—The Network–Oriented Data Acquisition System for the Medical Environment," *AFIPS Conference Proceedings*, Jun. 1977, pp. 295–299.

Y.W. Su, Hsu Chang, George Copeland, Paul Fisher, Eugene Lowenthal, Stewart Schuster, "Database Machines and Some Issues on DBMS Standards," *AFIPS Conference Proceedings*, May 1980, pp. 191–208.

R.H. Canaday, R.D. Harrison, E.L. Ivie, J.L. Ryder, L.A. Wehr, "A Back–end Computer for Data Base Management," *Communications of the ACM*, vol. 17, No. 10, Oct. 1974, pp. 575–582.

Thomas Marill, Dale Stern, "The Datacomputer—A Network Data Utility," *AFIPS Conference Proceedings*, May 1975, pp. 189–195.

Fred J. Maryanski, "Backend Database Systems," *Computing Surveys*, vol. 12, No. 1, Mar. 1980, pp. 3–25.

Fred J. Maryanski, Paul S. Fisher, Virgil E. Wallentine, Myron A. Calhoun, Louis Sernovitz, "A Minicomputer Based Distributed Data Base System," *IEEE*, pp. 113–117.

Fred J. Maryanski, "Performance of Multi–processor Back-–end Data Base Systems," pp. 437–441.

David K. Hsiao, Krishnamurthi Kannan, Douglas S. Karr, "Structure Memory Designs for a Database Computer," pp. 343–350.

Eugene I. Lowenthal, "A Survey—The Application of Data Base Management Computers in Distributed Systems," pp. 85–92.

Esen A. Ozkarhan, Kamal Oflazer, "Microprocessor Based Modular Database Processors," IEEE, 1978, pp. 300–311.

Richard Peebles, Eric Manning, "System Architecture for Distributed Data Management," *Computer*, Jan. 1978, pp. 40–47.

Jayanta Banerjee, David K. Hsiao, Richard Baum, "Concepts and Capabilities of a Database Computer," *ACM Transactions on Database Systems*, vol. 3, No. 4, Dec. 1978, pp. 347–384.

Douglas S. Karr, "Data Base Machines With Large Content Addressable Blocks and Structural Information Processors," *Computer*, Mar. 1979, pp. 64–79.

G.A. Champine, "Current Trends in Data Base Systems," *Computer*, May 1979, pp. 27–41.

Jayanta Banerjee, David K. Hsiao, Krishnamurthi Kannan, "DBC—A Database Computer for Very Large Databases," *IEEE Transactions on Computers*, vol. C–28, No. 6, Jun. 1979.

David J. DeWitt, "DIRECT—A Multiprocessor Organization for Supporting Relational Database Management Systems," *IEEE Transactions on Computers*, vol. C–28, No. 6, Jun. 1979.

H. Auer, W. Hell, H.–O. Leilich, J.S. Lie, H. Schweppe, S. Seehusen, G. Stiege, W. Teich, H. Ch. Zeidler, "RDBM—A Relational Data Base Machine," *Inform Systems*, vol. 6, No. 2, pp. 91–108, 1981.

Digital Research, "A Microcomputer Networking from Digital Research," *BYTE*, Dec. 1980, p. 223.

Digital Research, "CP/Net™ 1.0—Control Program for a Microcomputer Network: Functional Specification," 1980.

Andrew S. Tanenbaum, "Computer Networks," *Prentice Hall Software Series*, 1981, pp. 464–467.

Digital Research, "CP/Net—Microcomputer Network Control Program: User's Guide," 1980.
Billings Computer Corp., "A Computerized Real Estate Listing Service," Apr. 1978.
Jayanta Banerjee, David K. Hsiao, "Performance Study of a Database Machine in Supporting Relational Databases," *IEEE,* Sep. 1978, pp. 319–329.
H. Baskin, H. Holmes, R. Freitas, P. Stoffel, "Architecture of Data Base Oriented Systems," *Proceedings of the Berkeley Workshop on Distributed Data Management & Computer Networks,* Jun. 1976, pp. 339–351.
Haran Boral, David J. DeWitt, "Design Considerations for Data–flow Database Machines," *Proceedings ACM–SGMO,* 1980.
Robert Epstein, Paula Hawthorn, "Design decisions for the intelligent database machine," *AFIPS Conference Proceedings,* May 1980, pp. 237–241.
Lee A. Hollaar, "Rotating Memory Processors for the Matching of Complex Textual Patterns," *Fifth Symposium—Computer Architecture,* pp. 39–43.
Krishnamurthi Kannan, "The Design of a Mass Memory for a Database Computer," *Fifth Symposium—Computer Architecture,* pp. 44–51.
G.J. Lipovski, "Architectural Features of CASSM: A Context Addressed Segment Sequential Memory," *Fifth Symposium—Computer Architecture,* pp. 31–38.
Keith Morgan, "The Intel Database Processor," *IEEE,* 1983, pp. 288–290.
E.A. Ozkarahan, S.A. Schuster, K.C. Sevick, "Performance Evaluation of a Relational Associative Processor," *ACM Transactions on Database Systems,* vol. 2, No. 2, Jun. 1977, pp. 175–195.
Joseph J. Passafiume, "Providing Network Data Services Using a Backend Data Base Machine," *VLSI: New Architectural Horizons, CompCon, Spring '80, Digest of Papers,* 1980, pp. 251–262.
S.A. Schuster, H.B. Nguyen, E.A. Ozkarahan, K.C. Smith, "RAP. 2—An Associative Processor for Data Bases," *Fifth Symposium—Computer Architecture,* pp. 52–59.
Paula Hawthorn, "Is There an Ideal Database Machine?" *VLSI, CompCon, Spring '81, Digest of Papers,* Feb. 1981, pp. 104–107.
Robert Epstein, Louise Madrid, "The IDM 500—Communications Issues with Backend Processors," *VLSI, CompCon, Spring '81, Digest of Papers,* Feb. 1981, pp. 112–114.
Robert V. Dickinson, "The SDC Records Manager: A VLSI Based Text Retrieval and Communications System," *VLSI, CompCon, Spring '81, Digest of Papers,* Feb. 1981, pp. 115–118.
Robert Epstein, Paula Hawthorn, "Aid in the '80s," *Datamation,* vol. 26, No. 2, Feb. 1980, pp. 154, 157–158.
"EASy Does It: The EDUNET Network Access System," *X/2 SIGUCC Newsletter,* pp. 10–11.
A.J. Christian, K.L. Jones, "Intelligent Viewdata Terminals for Business Applications."
Healy, "Trends in Terminal Technology," *Infotech State of the Art Report, Data Communications, Invited Papers,* Series 8, No. 1, 1980, pp. 93–101.
J.C.R. Licklider, Albert Vezza, "Applications of Information Networks," *IEEE,* 1978, pp. 5/57–5/78.
Roger M. Needham, "Adding Capability Access to Conventional File Servers," pp. 3–4.
Maurice V. Wilkes, Roger M. Needham, "The Cambridge Model Distributed System," pp. 21–29.
N.H. Garnett, R.M. Needham, "An Asynchronous Garbage Collector for the Cambridge File Server," pp. 36–40.
Carl Dellar, "Removing Backing Store Administration from the CAP Operating System," pp. 41–49.
Daniel Swinehart, Gene McDaniel, David Boggs, "WFS: A Simple Shared File System for a Distributed Environment," *ACM,* 1979, pp. 9–17.
Liba Svobodova, "A Reliable Object–Oriented ATA Repository for a Distributed Computer System," *ACM,* 1981, pp. 47–58.
James G. Mitchell, Jeremy Dion, "A Comparison of Two Network–Based File Servers," *ACM,* 1981, pp. 45–46.
M. Fridrich, W. Older, "The Felix File Server," *ACM,* 1981, pp 37–44.
Edward P. Stritter, Harry J. Saal, Leonard J. Shustek, "Local Networks of Personal Computers," *VLSI, CompCon, Spring '81, Digest of Papers,* Feb. 1981, pp. 2–5.
Ernest Brock, "A Microcomputer Network Application in Banking," *VLSI, CompCon, Spring 81, Digest of Papers,* Feb. 1981, pp. 6–9.
Herbert B. Baskin, Elsa B. Horowitz, Robert D. Tennison, Larry E. Rittenhouse, "A Modular Computer Sharing System," *Communications of the ACM,* vol. 12, No. 10, Oct. 1969, pp. 551–559.
L.C. Hobbs, "The Rationale for Smart Terminals," *Computer,* Nov./Dec. 1971, pp. 33–35.
Caxton C. Foster, "A View of Computer Architecture," *Communications of the ACM,* vol. 15, No. 7, Jul. 1972, pp. 557–568.
J.D. Bagley, E.R. Floto, S.C. Hsieh, V. Watson, "Sharing Data and Services in a Virtual Machine System," *Operating Systems Review, Proceedings of the 5th Symposium on Operating Systems Principles,* vol. 9, No. 5, Nov. 1975, pp. 82–88.
L. Casey, N. Shelness, "A Domain Structure for Distributed Computer Systems," *Proceedings of the 6th Symposium on Operating Systems Principles,* Nov. 1977, pp. 101–108.
Jay E. Israel, James G. Mitchell, Howard E. Sturgis, "Separating Data from Function in a Distributed File System," *Operating Systems: Theory and Practice, Proceedings of the 2nd Int'l. Symposium on Operating Systems Theory and Practice,* Oct. 1978, pp. 17–27.
Butler W. Lampson, Robert F. Sproull, "An Open Operating System for a Single–User Machine," *ACM,* 1979, pp. 98–105.
David K. Gifford, "Weighted Voting for Replicated Data," *ACM,* 1979, pp. 150–162.
William H. Paxton, "A Client–Based Transaction System to Maintain Data Integrity," *ACM,* 1979, pp. 18–23.
A.D. Birrell, R.M. Needham, "A Universal File Server," *IEEE Transactions on Software Engineering,* vol. SE–6, No. 5, Sep. 1980, pp. 450–453.
Marco Bozzetti, "A General Overview of the Olivetti Network File System," *Information Processing 80, Proceedings of the IFIPS Congress 80,* Oct. 1980, pp. 551–556.
A.L. Scherr, "Distributed Data Processing," *IBM Systems Journal,* vol. 17, No. 4, 1978, pp. 324–343.
Tandem NonStop™ Systems, "Designing a Network–Based Transaction–Processing System," *Software Education and Design Support,* Apr. 1982.
Fred J. Maryanski, Paul S. Fisher, Richard D. Housh, David A. Schmidt, "A Prototype Distributed DBMS," pp. 205–214.
Judy Estrin, "Z–NET A Microprocessor Based Local Network", *ACM,* 1980, pp. 15–17.

Britton–Lee Inc., "IDM 500: Intelligent Database Machine, Product Description".

Stuart E. Madnick, "The Infoplex Database Computer: Concepts and Directions," *IEEE*, 1979, pp. 168–176.

Geary Arceneaux, Duane Binger, Jim Collins, Joe Collins, John Day, Lee Girard, Mike Hughes, Rita Kubitz, Kent Madsen, Mike Noonan, Steve Van Pelt, Robert Wayman, "A Close Look at PATHWAY," *Tandem SEDS Monograph Series*, Jun. 1982.

Jeri Lynn Edwards, "Integrating Corporate Information Systems: The Intelligent–Network Strategy," *Tandem Application Monograph Series*, Mar. 1983.

Greary Arceneaux, Kent Madsen, Tony Turner, "A Multi-–Function Network for Business Automation," *Tandem SEDS Monograph Series*, May 1982.

Larry Watson, Kent Madsen, "Capacity Planning for Tandem Computer Systems," *Tandem Application Monograph Series*, Oct. 1984.

Jeri Lynn Edwards, "Designing a Tandem/Word Processor Interface," *Tandem Application Monograph Series*, Mar. 1983.

Datapro Research Corp., "A Datapro Report on Tandem NonStop Systems," *Datapro Reports on Minicomputers*, Sep. 1983.

Bill Huggett, "The Model 6VI Voice Input Option: Its Design and Implementation," *Tandem Journal*, vol. 2, No. 3, Summer 1984, pp. 2–9.

Peter Oleinick, "The NonStop TXP Processor: A Powerful Design for On–line Transaction Processing," *Tandem Journal*, vol. 2, No. 3, Summer 1984, pp. 10–23.

Rob Welsh, "Optimizing Sequential Processing on the Tandem System," *Tandem Journal*, vol. 2, No. 3, Summer 1984, pp. 24–40.

David J. Farber, Kenneth C. Larson, "The System Architecture of the Distributed Computer System—The Communications System," *Proceedings of the Symposium on Computer–Communications Networks and Teletraffic*, vol. 22, Apr. 1972, pp. 21–27.

David J. Farber, Kenneth C. Larson, "The Structure of a Distributed Computing System—Software," *Proceedings of the Symposium on Computer–Communications Networks and Teletraffic*, vol. 22, Apr. 1972, pp. 539–545.

J.I. Powell, R. Fico, W.H. Jennings, E.R. O'Bryan, A.R. Schultz Jr., "A Local Network for Distributed Laboratory Microcomputers," *CompCon, Fall '80, Distributed Computing*, Sep. 1980, pp. 185–190.

"Distributed Systems," *Infotech State of the Art Report*, 1976, pp. 52–53.

P.D. Ting, D.C. Tsichritzis, "A Micro–DBMS for a Distributed Data Base," *4th Int'l Conference on Very Large Data Bases*, Sep. 1978, pp. 200–206.

Nestar Systems Inc., "Think Small, Fortune 500," *Wall Street Journal*, Sep. 1980, p. 2.

"Paring a Local Net with Some Apples," *Data Communications*, Jan. 1981, pp. 32, 34.

Tandem Computers Inc., "Introduction to Tandem Computer Systems".

Alan Norman, Mark Anderton, "EMPACT™: A Distributed Data Base Application," *AFIPS Press*, Oct. 1982.

Stewart A. Schuster, "Relational Data Base Management for On–Line Transaction Processing," *Tandem Computers Inc.*, Feb. 1981.

Joel F. Bartlett, "A NonStop™ Kernel," *Association of Computing Machinery*, Jun. 1981.

Andrea Borr, "Transaction Monitoring in ENCOMPASS™: Reliable Distributed Transaction Processing," *IEEE*, Jun. 1981.

Butler W. Lampson, Howard E. Sturgis, "Crash Recovery in a Distributed Data Storage System," *Xerox*, Apr. 1979.

James Martin, "Design and Strategy for Distributed Data Processing," *Prentice–Hall Inc.*, 1981.

James G. Mitchell, Jeremy Dion, "A Comparison of Two Network–Based File Servers," *Proceedings of the 8th Symposium on Operating Systems Principles*, vol. 15, No. 5, Dec. 1981, pp. 45–46.

Esther Surden, "Datapoint Concept Links Dedicated Processors," *Computerworld*, Dec. 5, 1977, pp. 1, 6.

"Editorials, Resource Sharing," *Computerworld*, Dec. 12, 1977, p. 20.

Esther Surden, "First ARC User Expects System To Ease Managers' Headaches," *Computerworld*, Jan. 9, 1978, pp. 61–62.

Datapoint Corporation, "Imagine: A Large–Scale Computer System. Functionally Dispersed Data Processing. A Common, Integrated Base. Unlimited Growth Without Economic Penalty. The ARC™ System," *Computerworld*, Jan. 23, 1978.

Don Leavitt, "Two–Year Project Pays Off: 'Back–End' DBMS Succeeds," *Computerworld*, Feb. 20, 1978, pp. 1, 6.

Paul Voakes, "Cluster/One: Timesharing has come to the microcomputer world," *Palo Alto Times*, Jan. 1979.

Stan Baker, "Cluster/One Connects 30 Apples, PETs Or TRS–80s," *Electronic Engineering Times*.

Nestar Systems Inc., "Why Be Controlled by a Timesharing System When You Can Control a Cluster/One?".

Nestar Systems Inc., "Cluster/One Storage Unit (CLO–1001), Specifications."

Nestar Systems Inc., "An Overview of the Cluster/One(™) System."

Nestar Systems Inc., "Cluster/One 'Model A', the Cluster-shared Microcomputer System," Feb. 1980.

Andrew S. Tanenbaum, "Computer Networks," *Prentice-–Hall Inc.*, 1981.

Stephen W. Ward, Christopher J. Terman, "An Approach to Personal Computing," *CompCon, Spring '80, Digest of Papers*, Feb. 1980, pp. 460–465.

Steven M. Abraham, Yogen K. Dalal, "Techniques for Decentralized Management of Distributed Systems," *CompCon, Spring '80, Digest of Papers*, Feb. 1980, pp. 430–437.

David D. Clark, Liba Svobodova, "Design of Distributed Systems Supporting Local Autonomy," *CompCon, Spring '80, Digest of Papers*, Feb. 1980, pp. 438–444.

A. Newell, S.E. Fahlman, R.F. Sprouli, H.D. Watlar, "CMU Proposal for Personal Scientific Computing," *CompCon, Spring '80, Digest of Papers*, Feb. 1980, pp. 480–483.

Brian Rosen, "PERQ: A Comercially Available Personal Scientific Computer," *CompCon, Spring 80, Digest of Papers*, Feb. 1980, pp. 484–485.

"HP Revamps 3000 Series III; Reduces Price of Series 33," *Computerworld*, Feb. 5, 1979.

Marcy Rosenberg, "SDS Resurfaces with Same Name, New Target," *Computerworld*, Feb. 12, 1979, pp. 111.

E. Drake Lundell Jr., "Data Base processors Seen As Building Blocks," *Computerworld*, Feb. 19, 1979, pp. 29–30.

"OLS to Support Datapoint 1500s," *Computerworld*, Mar. 5, 1979.

Datapoint Corp. "Just as Gold Is the Universal Measure of Economic Value, a Datapoint Arc™ System Is Business Data Processing's Standard of Cost–Effectiveness," *Computerworld*, Mar. 12, 1979.

Nestar Systems Inc., "Distributed Processing System Handles Various Venders' CPUs," *Computerworld, Microcomputing*, Mar. 19, 1979, pp. 53–54.

Don Leavitt, "[Pack]age Ties [PC] Micros to RCS Nets," *Computerworld*, Apr. 22, 1979, pp. 1, 8.

"Datapoint Unveils Disk System for T/S Attached Processors," *Computerworld*, Apr. 23, 1979, pp. 73, 76.

"System Joins Word Processor with Data Base," *Computerworld*, May 7, 1979, p. 55.

"'Midas' High–Level Language, Relational Data Base Offered," *Computerworld*, May 28, 1979.

Datapoint Corp., "Datapoint Will Lease You this 420k Computer System for $1,950 a Month and Ship it in about 12 Weeks," *Computerworld*, May 28, 1979, p. 75.

Datapoint Corp., "Comparing a Datapoint Arc™ System to a Conventional Computer Is like Comparing Apples to Oranges," *Computerworld*, Jun. 4, 1979, p. 25.

Eugene Lowenthal, "Data Base Processors: What Can They Do?" *Computerworld, In Depth*, Jun. 4, 1979, pp. 1–2, 4–8, 10–12.

Datapoiont Corp., "Announcing a complete Branch Office Computer Package for only $8,495 . . . from Datapoint. And it's leasable," *Computerworld*, Jun. 4, 1979, p. 111.

Tom Henkel, "Bigger, Better Data Base Machines Called Sign of the Times for '80s," *Computerworld*, Jun. 11, 1979, pp. 30.

Howard A. Karten, "Bank Forges Ahead with Electronic Mail," *Computerworld*, Jun. 11, 1979, p. 76.

Cullinane Corp., "When People Talk about Distributed Data Processing, They Usually Mean Distributed Database Processing," *Computerworld*, Jun. 18, 1979.

"Codasyl–Based DBMS Built for Network–Type Systems," *Computerworld*, Jun. 18, 1979, p. 34.

"Package Lets 8080, Z80 Users Emulate 3780 Communications," *Computerworld*, Jun. 18, 1979.

E. Drake Lundell Jr., "GE Brings Out Marklink," *Computerworld*, Dec. 4, 1978, pp. 1, 8.

Jeffry Beeler, "Network Facility Has DP, WP, Electronic Mail," *Computerworld*, Apr. 16, 1979, p. 9.

"Cluster WP System Offered," *Computerworld*, May 7, 1979.

"Program Turns TRS–80 to Terminal," *Computerworld*, 1979, p. 63.

William C. Pulley, David N. Williams, "Net Boosts Western Electric's Order Control," *Computerworld, Special Report*, Jul. 30, 1979, pp. 12, 30.

"Hyatt Hotels Moving to Decentralized DP," *Computerworld*, Jul. 30, 1979, pp. 23, 26.

Kevin K. Lee, "DDP Viable for Airline Maintenance Operation," *Computerworld, Special Report*, Jul. 30, 1979, pp. 6, 22.

Nixdorf Computer, "Nixdorf Distributed Processing: Available Now. The Right Combination of Power and Functions to Get the Job Done Right," *Computerworld*, Dec. 3, 1979.

"Net Architecture from DCC Gives Users DDP Environment," *Computerworld, Dec. 25, 1978/Jan. 1, 1979*, pp 29–30.

Marcy Rosenberg, "Distributed Data Base Design Goals Addressed," *Computerworld*, May 26, 1980, pp. 22.

"A Glossary for DDP Users," *Computerworld, Special Report*, Jul. 28, 1980, p. 6.

"DDP Collars Shirt Maker's Inventory Woes," *Computerworld*, p. 66.

"PCC Miniatures XL40 for DDP Applications," *Computerworld*, Jul. 10, 1978.

Sycor, "Now You Can Divide and Conquer," *Computerworld*, Oct. 16, 1978, pp. 10–11.

Grayce Booth, "Systems Control Demands Evolutionary Approach," *Computerworld*, Aug. 28, 1978, pp. 45, 49.

Grayce Booth, "Flexibility and Interfacing Major Factors in System Plan," *Computerworld*, Aug. 21, 1978, pp. 39, 42.

"Tandem Unveils Distributed DBMS," *Computerworld*, Jun. 9, 1980.

Wilbur H. Highleyman, "Survival Systems, Part 1: Transparency,"*Computerworld, In Depth*, pp. 19–22.

Wilbur H. Highleyman, "Survivable Systems, Parts 2 and 3: Process Structure and Process Management," *Computerworld, In Depth*, pp. 1–3, 6–10, 12.

"Service Bureau Network Enjoys 99% Uptime," *Computerworld*, Jun. 2, 1980, p. 60.

Don Leavitt, "'Guardian' Eases On–Line Protection," *Computerworld*, Jul. 16, 1979.

Connie Winkler, "Xerox Adds Intraoffice Net, Fellow System," *Computerworld*, Dec. 17, 1979, p. 5.

Tim Scannell, "Xerox Unwraps System for Use with Ethernet," *Computerworld*, Nov. 24, 1980, p. 6.

Mark A. Dingson and Wayne Martson, "Local–Area Nets: A Short History," *Computerworld, In Depth*, Jan. 12, 1981,pp. 14–15, 18.

"Nestar Extands Cluster/One to Handle Up to 64 Apples," *Computerworld*, Feb. 4, 1980, p. 59.

Jeffry Beeler, "Nestar to Aim Micro Sales at Business Users," *Computerworld*, May 5, 1980, p. 64.

"Kit Converts VT100 Into Micro," *Computerworld*, Feb. 16, 1981, p. 33.

"PDP–11 Based System Backs up to Sixty Terminals," *Computerworld*, Jul. 7, 1980, p. 59.

Ohio Scientific, "Microcomputing comes of age," *Computerworld*, Dec. 3, 1979.

Ohio Scientific, "The Microcomputers you should take seriously," *Computerworld*, Dec. 10, 1979.

Tim Scannell, "IBM Brings Out Terminal for Distributed Users," *Computerworld*, Jan. 14, 1980, p. 4.

Jay Woodruff, "Communicating Micros Challenging Terminals," *Computerworld, Special Report*, Mar. 31, 1980, pp. 23, 44.

IBM, "The New IBM 5280 Distributed Data System: The Intelligent Alternative," *Computerworld*, Feb. 4, 1980.

General Electric, "[Marklink Ter]minal Is How to Use Rcs Best." *Computerworld, In Depth*, . 9.

"Report Sizes Up Intelligent Terminal Outlook," *Computerworld*, Nov. 17, 1980, p. 84.

Brad Schultz, "Product Spotlight: Intelligent Terminals," *Computerworld*, vol. 14, No. 47, Nov. 17, 1980, pp. 1, 10–12.

Data Node, "'If I Only Had a Brain . . . '," *Computerworld*, Dec. 29, 1980/Jan. 5, 1981.

"Micro–Based Business Unit Integrates Intelligent CRT," *Computerworld*, Jul. 31, 1978, p. 44.

Bernabe Monsalvo, "RJE Offers Centralized, Distributed Benefits," *Computerworld, Data Communications Terminals*, Mar. 27, 1978, pp. S/19, S/34, S/36.

"IBM 8100 Ties WP, DP; Office Gear Enhanced," *Computerworld,* Jun. 23, 1980, pp. 1, 6.
Jeffry Beeler, "HP 3000s, IBM CPUs Get On–Line Link," *Computerworld,* Mar. 24, 1980, pp. 35–36.
IBM, Introducing the IBM 8100 Information System, *Computerworld,* Oct. 16, 1978.
Brooke Tompkins, "IBM 5110 to Enhance Distributed Data Bases?" *Computerworld,* Apr. 10, 1978, pp. 35–36.
E. Drake Lundell Jr., "IBM Takes Distributed Processing Plunge, 8100 Features 64K Chip," *Computerworld,* Oct. 9, 1978, pp. 1, 4, 6.
"Large ATM Net Planned on Coast," *Computerworld,* Oct. 22, 1979, p. 46.
"System Lets Bank Provide Uniform Service," *Computerworld,* Apr. 10, 1978, p. 46.
"Diebold Brings Out ATM," *Computerworld,* Apr. 3, 1978, p. 29.
Frederick H. Wu, "Data Base Provides Economy of Information," *Computerworld, Special Report,* Oct. 29, 1979, pp. 2, 4.
"Relational 'DBM–I' Uses Z80s," *Computerworld,* Sep. 10, 1979.
"HP System 45 Gets DBMS," *Computerworld,* Apr. 21, 1980, pp. 33.
"Definitions Needed for Understanding DBMS," *Computerworld, Special Report,* Oct. 27, 1980, pp. 3–4.
Intel, "Key to Success," *Computerworld,* Oct. 27, 1980.
Dr. Edgar F. Codd, "SQL/DS, What It Means," *Computerworld, In Depth,* Feb. 16, 1981, pp. 27–30.
Don Leavitt, "Session Examines Language/DBMS Interfaces," *Computerworld,* Jun. 12, 1978, p. 14.
Cullinane Corp., "IDMS–DC—the first and only data communications system designed with database in mind," *Computerworld,* Nov. 12, 1979, pp. 49.
Cullinane Corp., "Database:Cullinane," *Computerworld,* Oct. 10, 1979.
"NCR Data Pathing Systems Gain Data Base Software," *Computerworld,* Jan. 29, 1979. p. 26.
Don Leavitt, "DBMS Altered to Support Shared Data," *Computerworld, Software & Services,* Jan. 22, 1979, pp. 25–26.
"Meta 4 Addition Performs Alone or as RJE Station," *Computerworld,* Jan. 8, 1979, p. 69.
Don Leavitt, "DBMS Links IBM 4300s," *Computerworld,* Oct. 1, 1979, pp. 1, 6.
A.L. Scherr, "DDP: Whys and Whens—Part 2, Splitting the Function Flow: Optimizing Price/Performance," *Computerworld,* Oct. 1, 1979, pp. 45, 50.
Cullinane Corp., "When people talk about Distributed Data Processing they usually mean Distributed Database Processing," *Computerworld,* Jul. 16, 1979.
Tom Henkel, "Back–End Data Base Machine Announced—But for OEMs," *Computerworld,* vol. 14, No. 12, Mar. 24, 1980, pp. 1, 8.
"Distributed Data Bases Backed," *Computerworld,* Jun. 30, 1980, p. 2.
Ronald G. Ross, "Distributed Data Base Processing," *Computerworld, In Depth,* Apr. 7, 1980, pp. 1, 3–7, 10–16.
Software AG, "The Data Base Machine," *Computerworld,* Nov. 17, 1980.
"Data Base System Runs as Back End and Net Manager," *Computerworld,* Feb. 2, 1981, pp. 1, 7.

Marcia Blementhal, "Data Base Processor Not Visible In Cincom Systems' Future," *Computerworld,* Jan. 26, 1981, p. 86.
Vincent C. Rauzino, "The Looming Battle Between Data Base Machines and Software Data Base Management Systems," *Computerworld,* Dec. 29, 1980/Jan. 5, 1981, pp. 8, 10–12.
Marcy Rosenberg, "Software AG Users Rate Latest Adabas Release," *Computerworld,* Jun. 23, 1980, p. 16.
Rita Sheer, "Adabas Vendor Offers Data Base Machine," *Computerworld,* Oct. 27, 1980, pp. 1, 4.
"Xmark Announces Family of Systems," *Computerworld, Miniworld,* Dec. 3, 1979, pp. 65–66.
"MPU–Based Business Unit Gives Interactive Graphics," *Computerworld, Miniworld,* Oct. 22, 1979, pp. 57, 62.
"Software Allows Z80 Users To Transfer Data via Phone," *Computerworld,* Sep. 24, 1979, p. 42.
Software AG, "Software AG makes state–of–the–art DB/DC as easy as 1, 2, 3," *Computerworld.*
"Net Allows Access to 2,000 Programs," *Computerworld, Microcomputing,* Jul. 16, 1979.
"Apple II Users Gain Network with Access from 200 Cities," *Computerworld,* Aug. 13, 1979.
Jim Edlin, "Micro Makers Now Tooting Their Horns," *Computerworld,* Jul. 2, 1979, pp. 37–38.
"Zlab Links Development Station on Znet," *Computerworld,* Oct. 6, 1980, p. 76.
"Multiuser System Accesses Shared Disk," *Computerworld, Miniworld,* Aug. 11, 1980, p. 57.
Ohio Scientific, "Microcomputing comes of age," *Computerworld,* Jul. 28, 1980, p. 20.
Intertec Data Systems, "Compustar™," *Computerworld,* Jul. 28, 1980.
"Edunet Users Gain Micro System," *Computerworld,* Jul. 14, 1980, p. 76.
Brad Schultz, "Zilog Offers Local, Packet–Switched Net Design," *Computerworld,* May 16, 1980, p. 6.
"Multiplexer Ties Up to 64 MPUs," *Computerworld,* Apr. 28, 1980, p. 68.
"Zilog Unveils Three Entry–Level Units," *Computerworld, Miniworld,* Apr. 28, 1980, p. 67.
"Multistation System Supports Four Users," *Computerworld, Miniworld,* Apr. 14, 1980, p. 75.
Jay Woodruff, "Bank Invests in Micros Rather Than Terminals," *Computerworld, Special Report,* Mar. 31, 1980, p. 45.
Tim Scannell, "Start–Up Firm Debuts with Mini–Based Net," *Computerworld,* Nov. 14, 1980, p. 9.
"Rack–Mountable Micro Handles Up to 64 Users," *Computerworld,* Feb. 16, 1981, p. 66.
CP/M–Compatible Program Offers Remote Time–Sharing, *Computerworld,* Feb. 16, 1981, p. 49.
"GE Offers Five Options for Terminet 2030," Feb. 9, 1981, p. 83.
"[ . . . Computin]g Has Emerged Almost Overnight," *Computerworld,* Jan. 19, 1981, pp. 48–49.
"DDP System Built Around Z80," *Computerworld, Systems & Peripherals,* Nov. 17, 1980, p. 67.
Brad Schultz, "Users Told Micro Nets More Flexible Than T/S," *Computerworld,* Jan. 19, 1981, pp. 11–12.
Tim Scannell, "Micro Show Season Fast Approaching," *Computerworld, Microcomputing,* Sep. 4, 1978, p. 47.
Ann Dooley, "Hobbyists Start Bulletin Board," *Computerworld, Microcomputing,* pp. 71, 74.

"Ontel Adds Smart Terminal, Multiterminal Network," *Computerworld,* Jul. 10, 1978, p. 3.
"ARC Users Get Integrated DP, WP, EMS," *Computerworld,* Dec. 3, 1979, pp. 1, 8.
"Enhancements Double Datapoint 1500 Storage," Jan. 29, 1979, p. 53.
Datapoint Corp., "Datapoint Introduces the Best Little Cobol Computer Money Can Lease," *Computerworld,* Jan. 15, 1979.
Datapoint Corporation, "The ARC™ System," *Datamation,* Jan. 1978.
"No Big Machines for Datapoint," *Datamation,* Dec. 1977, pp. 204, 206.
"Datapoint Packs Six ARCs Into 'Starter Kit' for DDP," *Computerworld,* Jul. 2, 1979.
"Datapoint Makes Additions to ARC Applications Systems," *Computerworld, Communications,* p. 69.
"Texas Medical Center Integrates Systems," *Computerworld, Systems & Peripherals,* Aug. 4, 1980, pp. 51–52.
James N. Gray, "A Discussion of Distributed Systems," IBM Research Laboratory, San Jose, California, Sep. 13, 1979.
Datapoint Corp., "Datapoint Introduces True Office Integration: Four Systems, One Keyboard," *Computerworld,* Mar. 10, 1980, pp. 32–33.
Datapoint Corp., "Datapoint Will Lease You this 420 K Computer System for $1,950 a Month and Ship it in about 12 Weeks," *Computerworld,* Jan. 14, 1980, p. 75.
Datapoint Corp., "Datapoint will lease you this 420 K Computer System for $1,950 a month and ship it in about 12 weeks," *Computerworld,* Jul. 16, 1979, p. 35.
Nancy French, "Datapoint Unwraps Bus–Type 16–Bit System," *Computerworld,* Nov. 17, 1980, pp. 6, 9.
"St. Jude Hospital Enlists Dual ARC Systems for Research in Catastrophic Childhood Diseases," *Computerworld,* Nov. 10, 1980, pp. 40–41.
"Datapoint 1500 Gets Ansi Fortran," *Computerworld,* Nov. 10, 1980.
Datapoint Corp., "Out of the box, up and running fast," *Computerworld,* Dec. 29, 1980/Jan. 5, 1981, p. 91.
Jeffry Beeler, "Merger of Infoswitch, ARC Among Debuts at TCA Show," *Computerworld,* Oct. 16, 1978, pp. 41, 48.
Don Leavitt, "Datapoint 1800 Handles Cobol, Runs with ARC," *Computerworld,* Aug. 28, 1978, pp. 1, 8.
"Datapoint Ties ARC, Remote Processors," *Computerworld, Communications,* Apr. 7, 1980, pp. 37, 40.
Esther Surden, "Business Micros Serve Concerned Public," *Computerworld,* Feb. 27, 1978, pp. 53–54.
John J. Hunter, "Security: Plan It Now or Pay for It Later," *Computerworld, Special Report, Distributed Processing,* Mar. 6, 1978, pp. S/2, S/38.
Richard B. Gentile, Joseph R. Lucas, "The TABLON mass storage network," *AFIPS Conference Proceedings,* vol. 38, May 1971, pp. 345–356.
Intel Corporation, "IDBP, DBMS Reference Manual, Preliminary Release 1," May 1981.
Bao T. Nguyen, "DBMS vs. Data Base Machine," *Shop Talk,* pp. 73, 82.
Haran Boral, David J. DeWitt, "Applying Data Flow Techniques to Data Base Machines," *IEEE,* Aug. 1982, pp. 57–63.
Richard Eagleson, "New Database Software, Part 8: the Britton–Lee Database Machine," *Small Systems World,* Dec. 1982, pp. 25–29.
David J. DeWitt, Paula B. Hawthorn, "A Performance Evaluation of Database Machine Architectures," *IEEE,* 1981, pp. 199–213.
Paula Hawthorn, Michael Stonebraker, "Performance Analysis of a Relational Data Base Management System," *ACM,* 1979, p. 1–12.
Dina Bitton, David J. DeWitt, Carolyn Turbyfill, "Benchmarking Database Systems, A Systematic Approach, 1983 VDLB Version," *Computer Sciences Dept., Univ. of Wisconsin—Madison.*
Intel Corp., "Guide to IDBP, Order No.: 222104–001," Jul. 1982.
Intel Corp., "Intel Data Base Processor Program".
Britton–Lee, "IDM 500 Software Reference Manual, Version 1.3," Sep. 1981.
Billings Computer Corp., "Calcomp Floppy Operation To Stay on Coast: Billings," *Computerworld,* Apr. 16, 1979, pp. 48.
Datapoint Corp., "Comparing a Datapoint Arc™ System to a Conventional Computer Is like Comparing Apples to Oranges," Apr. 1979. pp. 27.
"Datapoint Sees Offices The Market of the Future," *Computerworld,* Oct. 22, 1979, p. 68(?).
"Datapoint Unveils an 'Attached Resource Computer' (ARC) as DDP Vendors Search for Ways to Implement Resource Sharing," *EDP Industry Report,* vol. 13, No. 10, Dec. 1977, pp. 1–5.
Vincent C. Rauzino, "The Present and Possible Future, Data Base Machines," *Computerworld, In Depth,* pp. 1–4, 6–8, 14–15, 19–20.
G.J. Baker, "Database and Teleprocessing Software Review," *Database Journal,* vol. 8, No. 2, Sep. 1978, pp. 2–3.
G.J. Baker, "Database World," *Database Journal,* vol. 8, No. 2, Sep. 1978, pp. 23.
G.J. Baker, "Database and Teleprocessing Software Review, Part 1," *Database Journal,* vol. 10, No. 2, Sep. 1980, pp. 2–3.
S.D. Fitches, "The Adaptable Database Management System," *Database Journal,* vol. 7, No. 2, pp. 2–8.
Richard I. Baum, David K. Hsiao, "Database Computers—A Step Towards Data Utilities," *IEEE Transactions on Computers,* vol. C–25, No. 12, Dec., pp. 1254–1259.
Richard I. Baum, David K. Hsiao, "A Data Secure Computer Architecture," *CompCon, Spring '76, Computers, the next 5 years,* Feb. 1976, pp. 113–117.
*Business Week, Industrial Edition,* Nov. 24, 1980, p. 106.
"Datapoint Leapfrogs into the Offie," *Business Week,* Dec. 10, 1979, p. 93.
Ann Dooley, "Sarting Salaries Found High; Hikes Slower," *Computerworld,* Feb. 2, 1981, pp. 1, 7.
Jeffrey Kutler, "Datapoint Introduces Automated Office Line: Pacific National Bank Among First Purchasers," *American Banker,* Dec. 1979.
J.N. Gray, R.A. Lorie, and G.R. Putzolu, "Granularity of Locks in a Large Shared Data Base," Jun. 30, 1975.
J. Leonard Tolman, "Total Distributed Processing With Micros," *Computer Progress,* Billings Computer Corporation, vol. 1, 4th Quarter, 1977, pp. 26–29.
J. Leonard Tolman, "Billings Multi–Programming System," *Computer Progress,* Billings Computer Corporation, vol. 2, 1st Quarter, 1978, p. 12.

Michael W. Sturgill and J. Leonard Tolman, "Basic Concepts of Billings' Distributed Processing Network," *Computer Progress,* Billings Computer Corporation, vol. 2, 1st Quarter, 1978, pp. 13–14.

Tim Scannell, "Datapoint Meshes DP, WP, EMS for ARC," *Comptuerworld,* Dec. 3, 1979, p. 1.

Jim Gray, et al., "The Recovery Manager of a Data Management System," IBM Research Laboratory, Sna Jose, California, Aug. 15, 1979.

"Overview of a Relational Implementation: System R," *Concepts and Planning; The Data Model and DBMS Architecture* Auerbach Publishers, Inc.

Irving L. Traiger, James N. Gray, Cesare A. Galtieri, and Bruce G. Lindsay, "Transactions and consistency in Distributed Database Systems," IBM Research Laboratory, San Jose, California, Jun. 5, 1979.

James Gray, "Notes on Data Base Operating Systems", IBM Research Laboratory, San Jose, California, Feb. 23, 1978.

Jim Gray, "A Transaction Model," IBM Research San Jose Research Laboratory, San Jose, California, Feb. 1980.

Andries van Dam, George M. Stabler, and Richard J. Harrington, "Intelligent Satellites for Interactive Graphics", *Proceedings of the IEEE,* Apr. 1974, pp. 483–492.

Sten Adler, et al., "System D: A Distributed Systes for Availability," IBM Research Laboratory, San Jose, California, Nov. 19, 1981.

Beatrice Del Vecchio, Philippe Penny, "The Phlox Project: Three Data Bases Management Systems for Micro–Computers", *ACM,* 1980, pp. 173–178.

Data Base Task Group, "CODASYL Data Base Task Group", *Association for Computer Machinery,* Apr. 1971.

Tedd A. Cohen, "In the valley of the giants," *Forbes,* Dec. 1979.

Datapoint, *PR Newswire,* Mar. 1981.

*PR Newswire,* Oct. 1980.

"Hard Times for The Source," *Business Week,* Sep. 15, 1980, pp. 112.

Warner Amex Cable Communications, *PR Newswire,* Jul. 1980.

Deirdre Carmody, "First U.S. Experiments in Electronic Newspapers Begin in Two Communities," *The New York Times,* Jul. 7, 1980.

"Eleven AP Newspapers Experiment with Electronic News Delivery," *The Associated Press,* Jun. 26, 1980.

"AP Members' Group Tests Home Computer News Service," *The Associated Press,* Jun. 9, 1980.

"Low–Cost Home Terminal Closer," *American Banker,* Jun. 4, 1980.

Radio Shack, *PR Newswire,* May 28, 1980.

Martha M. Hamilton, "Printing Firm Asks Lien on The Source; Complicates Home Computer Network Case," *The Washington Post,* Nov. 7, 1980.

Donald H. Dunn, "The many uses of the 'personal' computer," *Business Week,* Jun. 23, 1980, p. 125.

Martha M. Hamilton, "Company with Bright Future has to Survive Rough present; The Source of Taub's Optimism," *The Washington Post,* Feb. 10, 1980, p. G1.

Marilyn Wellemeyer, "Bitten by the Computer Bug," *Fortune,* Jul. 14, 1980, p. 29.

"PO–1323–00," Feb. 1, 1978, pp. 1/1–2/21.

Stuart Wecker, "DNA: The Digital Network Architecture," *IEEE Transactions on Communications,* vol. Com–28, No. 4, Apr. 1980, pp. 510–526.

David R. Boggs, John F. Shoch, Edward A. Taft, Robert M. Metcalfe, "Pup: An Internetwork Architecture," *IEEE Transactions on Communications,* vol. Com–28, No. 4, Apr. 1980, pp. 612–624.

Andrew S. Tannenbaum, "Computer Networks," *Prentice–Hall,* 1981.

Thomas A. Rolander, "Microcomputer Software Meshes with Local Nets," *Electronics,* Jan. 27, 1982, pp. 96.

Thomas A. Rolander, Randall Baird, John Wharton, "Network Software Borrows Design from Microcomputer Operating System," *Data Communications,* Dec. 1982, p. 123.

Cluster O/S, "To Dealers and Prospective Dealers" *Nestar Systems Incorporated,* Jun. 1, 1979.

Cluster One, "Domestic Price List," *Nestar Systems Incorporated,* Sep. 1, 1979.

OS–650 Level 3, "Microcomputing Comes of Age," *Ohio Scientific,* Nov. 1979.

Thomas Marill, Dale Stern, "The Datacomputer—a Network Data Utility," *AFIPS Conference Proceedings NCC,* May 19–22, 1975, pp. 389–395.

Britton–Lee, Inc., "IDM 500 Intelligent Database Machine Software Manual Version 1.2", 1980, 1981.

D. D. Chamberlin, J. N. Gray, P. P. Griffiths, M. Mresse, I.L. Traiger, B. W. Wade, "Data Base System Authorization," *Academic Press,* 1978, pp. 40–55.

M. M. Astrahan, M. W. Blagen, D. D. Chamberlin, K. P. Eswaran, J. N. Gray, P. P. Griffiths, W. F. King, R. A. Lorie, P. R. McJones, J. W. Mehl, G. R. Putzolu, I. L. Traiger, B. W. Wade, V. Watson, "System R: Relational Approach to Database Management," *ACM Transactions on Database Systems,* vol. 1, No. 2, Jun. 1976, pp. 97–137.

K. P. Eswaran, J. N. Gray, R. A. Lorie, I. L. Traiger, "On the Notions of Consistency and Predicate Locks in a Data Base System," *ACM,* vol. 19, No. 11, 1976, pp. 624–631.

Boris Beizer, "The Architecture and Engineering of Digital Computer Complexes", *Plenum Press,* 1971, pp. 440–444.

David K. Gifford, "Violet, an Experimental Decentralized System," *Xerox Palo Alto Research Center,* Sep. 1979.

D. Swinehart, D. Boggs, G. McDaniel, "The Woodstock File Cache," *Xerox Palo Alto Research Center,* Mar. 28, 1976.

Xerox, "Alto Subsystems," *Xerox Palo Alto Research Center,* Apr. 29, 1978.

C. P. Thacker, E. M. McCreight, B. W. Lampson, R. F. Sproull, D. R. Boggs, "Alto: A personal computer," *Xerox Palo Alto Research Center,* Aug. 7, 1979.

Xerox, "Alto User's Handbook," *Xerox Palo Alto Research Center,* Sep. 1979.

Robert Perron, "CODASYL Data Base Management Systems: Design Fundementals," *QED Information Sciences Inc.,* 1981.

Dale Kutnick, "Distributed Processing and the Automated Office," *Horizon House Int'l.,* Mar. 1979, pp. 56–59.

Jim Gray, "Locking in a Decentralized Computer System", *IBM Research,* Feb. 8, 1974.

James Martin, "Principles of Data–base Management," *Prentice–Hall Inc.,* 1976, pp. 26–29, 138–141, 155–160, 166–167.

Paula B. Hawthorn and David J. DeWitt, "Performance Analysis of Alternative Database Machine Architectures," IEEE Transactions on Software Engineering, vol. SE–8, No. 1, Jan. 1982, pp. 62–75.

Paula Hawthorn, "Microprocessor Assisted Tuple Access, Decompression and Assembly for Statistical Database Systems," *Proceedings of the Eighth International Conference on Very Large Data Bases,* Mexico City, Sep., 1982, pp. 223–233.

Paula Birdwell Hawthorn, "Evaluation and Enhancement of the Performance of Relational Database Management Systems," Electronics Research Laboratory, University of California, Berkeley, Nov. 7, 1979.

P. A. Franaszek and B. T. Bennett, "Adaptive Variation of the Transfer Unit in a Storage Hierarchy," IBM Thomas J. Watson Research Center, Yorktown Heights, New York, Nov. 30, 1976.

Stephen W. Sherman and Richard S. Brice, "Performance of a Database Manager in a Virtual Memory System," ACM Transactions on Database Systems, vol. 1, No. 4, Dec. 1976.

Malcolm C. Easton, "Model for Data Base Reference Strings Based on Behavior of Reference Clusters," IBM Thomas J. Watson Research Center, Yorktown Heights, N.Y., Mar. 11, 1977.

William G. Tuel, Jr. and Juan Rodriguez–Rosell, "A Methodology for Evaluation of Data Base Systems," IBM Thomas J. Watson Research Center, Yorktown Heights, New York, Oct. 15, 1975.

IBM Thomas J. Watson Research Center, A Framework for Evaluation of Data Base Systems, Yorktown Heights, New York, May 23, 1975.

Stanley Y.W. Su and G. Jack Lipovski, "CASSM: A Cellular System for very Large Data Bases," Proceedings of the VLDB, Sep. 1975, pp. 456–470.

Stephen W. Sherman and Richard S. Brice, "I/O Buffer Performance in a Virtual Memory System," Proceedings of Symposium on Simulation of Computer Systems, National Bureau of Standards, Boulder, CO, Aug. 10–12, 1976, Harold J. Highland, Editor.

Fumio Nakamura, Ikuzo Yoshida and Hidefumi Kondo, "A Simulation Model for Data Base System Performance Evaluation," National Computer Conference, 1979, pp. 459–465.

Gerald H. Fine, Calvin W. Jackson, and Paul V. McIsaac, Dynamic Program Behavior Under Paging, Proceedings—A.C.M. National Meeting, 1966, pp. 223–228.

Richard S. Brice, Stephen W. Sherman, "Empirical Comparison of Partitioned and Non–partitioned Buffer Management in Virtual Memory Systems," *Computer Performance Evaluation,* The Chameleon Press Limited, London, England, pp. 1–15.

William G. Tuel, Jr. "An Analysis of Buffer Paging in Virtual Storage Systems," IBM Research Laboratory, San Jose, California, Jul. 25, 1974.

Malcolm C. Easton, "Model for Interactive Data Base Reference String," IBM Thomas J. Watson Research Center, Yorktown Heights, New York, Sep. 26, 1974.

Peter J. Denning, "Thrashing: Its Causes and Prevention," Fall Joint Computer Conference, 1968, pp. 915–922.

S. H. Fuller, "Orthogonal Versus Array Computing," Digital Systems Laboratory, Stanford Electronics Laboratories, Stanford University, Stanford, California, Oct. 1970.

Alan Jay Smith, "Sequentiality and Prefetching in Data Base Systems," IBM Research Laboratory, San Jose, California, Mar. 19, 1976.

Niklaus Ragaz and Juan Rodriguez–Rosell, "Empirical Studies of Storage Management in a Data Base System," IBM Research Division, San Jose, California, Oct. 7, 1976.

Juan Rodriguez–Rosell, "Locality in Data Base Systems," Division of Applied Mathematics, Brown University, Providence, R.I., Dec. 1973.

G. F. Colouris, J.M. Evans, and R.W. Mitchell, (Title missing), *The Computer Journal,* vol. 15, No. 2, 1971, pp. 95–98.

David Elliot Shaw, "A Hierarchical Associative Architecture for the Parallel Evaluation of Relational Algebraic Database Primitives," Department of Computer Science, Columbia University, (originally published at Stanford Computer Science Department Report No. STAN–CS–79–779, Oct., 1979).

M. Stonebraker, "A Distributed Data Base Machine," Electronics Research Laboratory, College of Engineering, University of California, Berkeley, CA, May 23, 1978.

Paula Hawthorn, F. Bancilhon, R. Epstein, R. Haskin, D. DeWitt, E. Oliver, "Panel on Database Machinery," IEEE, 1980, pp. 393–395.

Robert H. Holland, "Improve Information Access With the Database Machine," *Data Communications,* Mar. 1980, pp. 95–99.

Chyuan Shiun Lin, Diane C.P. Smith, and John Miles Smith, "The Design of a Rotating Associative Memory for Relational Database Applications," ACM Transactions on Database Systems, vol. 1, No. 1, Mar. 1976, pp. 53–65.

Werner E. Kluge, "Data File Management in Shift–Register Memories," ACM Transactions on Database Systems, vol. 3, No. 2, Jun. 1978, pp. 159–177.

Richard S. Brice and Stephen W. Sherman, "An Extension of the Performance of a Database Manager in a Virtual Memory System Using Partially Locked Virtual Buffers," ACM Transactions on Database Systems, vol. 2, No. 2, Jun. 1977, pp. 196–207.

E. Babb, "Implementing a Relational Database by Means of Specialized Hardware," ACM Transactions on Database Systems, vol. 4, No. 1, Mar. 1979, pp. 1–29.

Juan Rodriguez–Rosell, "Empirical Data Reference Behavior in Data Base Systems," *Computer,* Nov. 1976, pp. 9–13.

Glen G. Langdon, Jr., "A Note on Associative Processors for Data Management," ACM Transactions on Database Systems, vol. 3, No. 2, Jun. 1978, pp. 148–158.

E.A. Ozkarahan and K.C. Sevcik, "Analysis of Architectural Features for Enhancing the Performance of a Database Machine," ACM Transactions on Database Systems, vol. 2, No. 4, Dec. 1977, pp. 297–316.

West Coast Report, *Practical Computing,* Aug. 1979, pp. 41–43.

Bruce LeBoss, "Network Links Units, Includes Mass Store," Reprinted from *Electronics,* Jan. 31, 1980.

Jonathan Hule, "Workstation Clusters Expedite Local Network Processing," *Electronic Design,* Feb. 19, 1981, pp. 129–134.

Robert A. Garrow, Pauline Lo Alker, and Paul Rosenfeld, "Technologies Converge in Multifunction System," Mini–Micro Systems, Oct. 1980, pp. 85–88, 90.

Convergent Technologies, "Convergent 2000 Series Cluster Information Processing Systems," 1980.

Nestar Systems Incorporated, Letter Re: Cluster/One System information packet, Jan. 1980.

Datapoint Corporation, *Out–Think,* Sep. 1980.

Datapoint Corporation, "Product Specification & Processor Reference Manual, Cassette 1100, Diskette 1100,Datapoint 2200," 1977.

Datapoint Corporation, "Securities and Exchange Commission, Form 10–K For the Fiscal Year Ended Jul. 31, 1979."

Datapoint Corporation, "Securities and Exchange Commission, Form 10–K For the Fiscal Year Ended Jul. 31, 1981."
Datapoint Corp., "New 6000 Series Attached Processors Announced," 'D' News, Dec. 1977.
Terry Drace, "Datapoint's Arccom™ Extends the Concept of Resource Sharing to 3270 Communications," Datapoint Corporation, Mar. 14, 1980.
John Greitzer, "Nestar Ties Distributed Apple Orchard Together," Computer Business News, Feb. 11, 1980, p. 12.
"Nestar Adds Disks to Form Apple Net," Electronic News, Feb. 4, 1980. Also, "Nestar Markets Personal System," Computer Business News, Feb. 4, 1980.
Nestar Systems Incorporated, "Nestar Systems, Inc. To Unveil "The Messenger" at Comdex '80," Nov. 3, 1980.
"Datapoint quadruples memory capacity for new 16–bit machine," Electronics, Nov. 20, 1980, p. 34.
Paul E. Green, Jr, "An Introduction to Network Architectures and Protocols," IEEE Transactions on Communications, vol. COM–28, No. 4, Apr. 1980, pp. 413–424.
Hubert Zimmermann, "OSI Reference Model—The ISO Model of Architecture for Open Systems Interconnection," IEEE Transactions on Communications, vol. COM–28, No. 4, Apr. 1980, pp. 425–432.
H.V. Bertine, "Physical Level Protocols," IEEE Transactions on Communications, vol. COM–28, No. 4, Apr. 1980, pp. 433–444.
James W. Conrad, "Character–Oriented Data Link Control Protocols," IEEE Transactions on Communications, vol. COM–28, No. 4, Apr. 1980, pp. 445–454.
David E. Carlson, "Bit–Oriented Data Link Control Procedures," IEEE Transactions on Communications, vol. COM–28, No. 4, Apr. 1980, pp. 455–467.
Pouad A. Tobagi, "Multiaccess Protocols in Packet Communication Systems," IEEE Transactions on Communications, vol. COM–28, No. 4, Apr. 1980, pp. 468–488.
Harold C. Folts, "Procedures for Circuit–Switched Service in Synchronous Public Data Networks," IEEE Transactions on Communications, vol. COM–28, No. 4, Apr. 1980, pp. 489–495.
Harold C. Folts, "X.25 Transaction–Oriented Features—Datagram and Fast Select," IEEE Transactions on Communications, vol. COM–28, No. 4, Apr. 1980, pp. 496–509.
James D. Atkins, "Path Control: The Transport Network of SNA," IEEE Transactions on Communications, vol. COM–28, No. 4, Apr. 1980, pp. 527–538.
Mischa Schwartz and Thomas E. Stern, "Routing Techniques Used in Computer Communication Networks," IEEE Transactions on Communications, vol. COM–28, No. 4, Apr. 1980, pp. 539–552.
Mario Gerla and Leonard Kleinrock, "Flow Control: A Comparative Survey," IEEE Transactions on Communications, vol. COM–28, No. 4, Apr. 1980, pp. 553–574.
Iwao Toda, "DCNA Higher Level Protocols," IEEE Transactions on Communications, vol. COM–28, No. 4, Apr. 1980, pp. 575–584.
John D. Day, "Terminal Protocols," IEEE Transactions on Communications, vol. COM–28, No. 4, Apr. 1980, pp. 582–593.
Verlin L. Hoberecht, "SNA Function Management," IEEE Transactions on Communications, vol. COM–28, No. 4, Apr. 1980, pp. 594–603.
Jonathan B. Postel, "Internetwork Protocol Approaches," IEEE Transactions on Communications, vol. COM–28, No. 4, Apr. 1980, pp. 604–611.
Gregor V. Bochmann and Carl A. Sunshine, "Formal Methods in Communication Protocol Design," IEEE Transactions on Communications, vol. COM–28, No. 4, Apr. 1980, pp. 624–631.
Andre A. S. Danthine, "Protocol Representation with Finite–State Models," IEEE Transactions on Communications, vol. COM–28, No. 4, Apr. 1980, pp. 632–642.
Gregor V. Bochmann, "A General Transition Model for Protocols and Communication Services," IEEE Transactions on Communications, vol. COM–28, No. 4, Apr. 1980, pp. 643–650.
Pitro Zafiropulo, Colin H. West, Harry Rudin, D.D. Cowan, and Daniel Brand, "Towards Analyzing and Synthesizing Protocols," IEEE Transactions on Communications, vol. COM–28, No. 4, Apr. 1980, pp. 651–660.
Gary D. Schultz, David B. Rose, C.H.West, and James P. Gray, "Executable Description and Validation of SNA," IEEE Transactions on Communications, vol. COM–28, No. 4, Apr. 1980, pp. 661–677.
Datapro Research Corporation, "Distributed Processing: Can This Fashionable Idea Work for the Future?" Evolving Office of the Future, Jan. 1980.
C. J. Date, "An Introduction to Database Systems", Second Edition, Addison–Wesley Publishing Co., 1977.
J. Gray, B. Lampson, B. Lindsay, H. Sturgis, The Control Structure of an Operating System, IBM Research, Jul. 21, 1972.
"TOTAL Data Base Management System", Feb. 1, 1978.
D. Chamberlin, M. Astrahan, R. Lorie, J. Mehl, T. Price, M. Schkolnick, P. Selinger, D. Slutz, B. Wade, R. Yost, "Support for Repetitive Transactions and AD–HOC Query in System R", IBM Research, May 22, 1979.
E. Benhamou, J. Estrin, "Design Goals for Znet: A Local Network of Microcomputers", IEEE, 1981, pp. 54–58.
E. Unger, R. McBride, J. Slonim, F. Maryanski, "Design for Integration of a DBMS into a Network Environment", IEEE, 1979, pp. 26–34.
R. Popescu–Zeletin, "The Data Access and Transfer Support in a Local Heterogeneous Network (HMINET)", IEEE, 1979, pp. 147–151.
John Fletcher, Richard Watson, "Service Support in a Network Operating System", IEEE, 1980, pp. 415–424.
James Gray, Services Provided to Users of SNA Networks, IEEE, 1979, pp. 52–61.
Logical, "External Verbs, Reference Manual", Logical Machine Corp., 1980.
"Microcomputer PL/1 gets record–retrieval system", Electronics, Jan. 13, 1981, pp. 304.
Judy Estrin, Bill Carrico, "Local network enlists Z80s for distributed processing", Electronics, Feb. 10, 1981, pp. 149153.
Electronics newsletter, "Tek's 8500 development aid–ready to bow", Electronics, Sep. 25, 1980 pp. 33.
C. Bass, J. Kennedy, J. Davidson, "Local network gives flexibility to distributed processing", Electronics, Sep. 25, 1980, pp. 114–122.
"Nestar's local net goes European", Electronics, Oct. 9, 1980, p. 48.
"Operating system shares storage", Electronics, Oct. 23, 1980, p. 310.
Tom Manuel, "Automating Offices from Top to Bottom", Electronics, Mar. 10, 1981, pp. 157–165.
K. S., "Chips, twisted pair build simple local net", Electronics, Aug. 28, 1980, pp. 80.

"Software integrates many functions", *Electronics*, Dec. 6, 1979, pp. 44–46.

D. Farber, F. Heinrich, The Structure Of A Distributed Computer System—The Distributed File System, *Computer Communications: Impacts and Implications*, Oct. 24–26, 1972, pp. 364–370.

R. Ashenhurst, R. Vonderhoe, "A Hierchical Network", *Datamation*, Feb. 1975.

Jed Donnelley, Components of a Network Operating System, *North Holland Publishing Co.*, 1979, pp. 389–399.

Richard Watson, John Fletcher, "An Architecture for Support of Network Operating System Services", *North Holland Publishing Co.*, 1980, pp. 33–49.

"ANOS/ADAY, A Network Operating System for Microcomputers, Rev. 0.5", *Avocet Systems, Inc.*, 1980.

E.B. Fernandez, R.C. Summers, C. Wood, "The Systems Programming Series Database Security and Integrity", *Addison–Wesley Publishing Company*, 1981.

Jon D. Clark, "Data Base Selection, Design, and Administration", *Praeger Publishers CBS Educational and Professional Publishing*, 1980.

John R. Knight, "A Case Study: Airlines Reservations Systems", *IEEE*, 1972, pp. 48–56.

R. W. Allen, Development of a Microcomputer–Based Teleconference System, *IEEE*, 1980, pp. 85–93.

Anne–Marie Glorieux and Louis Treille, "Distributing a Live System Into a Distributed Data Base Management System: Sirius–Delta Experience", *IEEE*, 1980, pp. 19–25.

Alan C. Shaw, "The Logical Design of Operating Systems", *Prentice–Hall, Inc.*, 1974.

Digital Equipment Corp., "DEC merges word and data processing," Business Week, *McGraw–Hill, Inc.*, Jun. 6, 1977, pp. 2–4.

"The Seybold Report of Word Processing," *Seybold Publications, Inc.*, vol. 3, No. 10, Nov. 1980.

"The Seybold Report on Word Processing," *Seybold Publications, Inc.*, vol. 3, No. 11, Dec. 1980.

"The Seybold Report on Word Processing," *Seybold Publications, Inc.*, vol. 4, No. 1, Jan. 1981.

"The Seybold Report on Word Processing," *Seybold Publications, Inc.*, vol. 4, No. 2, Feb. 1981.

"The Seybold Report on Word Processing," *Seybold Publications, Inc.*, vol. 3, No. 9, Oct. 1980.

"The Seybold Report on Word Processing," *Seybold Publications, Inc.*, vol. 3, No. 8, Sep. 1980.

"The Seybold Report on Word Processing," *Seybold Publications, Inc.*, vol. 3, No. 7, Aug. 1980.

"The Seybold Report on Word Processing," *Seybold Publications, Inc.*, vol. 3, No. 6, Jul. 1980.

"IBM Unleashes 'Panther'," A Seybold Bulletin, *Seybold Publications*, Jun. 23, 1980.

"The Seybold Report on Word Processing," *Seybold Publications, Inc.*, vol. 3, No. 5, Jun. 1980.

"The Seybold Report on Word Processing," *Seybold Publications, Inc.*, vol. 3, No. 4, May 1980.

"The Seybld Report on Word Processing," *Seybold Publications, Inc.*, vol. 3, No. 3, Apr. 1980.

"The Seybold Report on Word Processing," *Seybold Publications, Inc.*, vol. 2, No. 11, Dec. 1979.

"The Seybold Report on Word Processing," *Seybold Publications, Inc.*, vol. 2, No. 10, Nov. 1979.

"The Seybold Report on Word Processing," *Seybold Publications, Inc.*, vol. 2, No. 9, Oct. 1979.

"The Seybold Report on Word Processing," *Seybold Publications, Inc.*, vol. 2, No. 8, Sep. 1979.

"The Seybold Report on Word Processing," *Seybold Publications, Inc.*, vol. 2, No. 7, Aug. 1979.

"The Seybold Report on Word Processing," *Seybold Publications, Inc.*, vol. 2, No. 6, Jul. 1979.

"The Seybold Report on Word Processing," *Seybold Publications, Inc.*, vol. 2, No. 5, Jun. 1979.

"The Seybold Report on Word Processing," *Seybold Publications, Inc.*, vol. 2, No. 4, May 1979.

"The Seybold Report on Word Processing," *Seybold Publications, Inc.*, vol. 2, No. 3, Apr. 1979.

"The Seybold Report on Word Processing," *Seybold Publications, Inc.*, vol. 2, No. 1, Feb. 1979.

"The Seybold Report on Word Processing," *Seybold Publications, Inc.*, vol. 1, No. 12, Jan. 1979.

"Proceedings of the Second Berkeley Workshop on Distributed Data Management and Computer Networks", *Lawrence Berkeley Laboratory University of California, Berkeley*, May 1977.

"Proceedings of the Third Berkeley Workshop on Distributed Data Management and Computer Networks", *Lawrence Berkeley Laboratory University of California, Berkeley*, Aug. 1978.

"Proceedings of the Fourth Berkeley Workshop on Distributed Data Management and Computer Networks", *Lawrence Berkeley Laboratory University of California, Berkeley*, Aug. 1979.

Sead Muftic, Nazif Husovic, "On Functionally Distributed Computing Systems", *IEEE*, 1979.

Hamish Donaldson, "Designing a distributed processing system", *Halsted Press*, 1979, pp. 1–16.

Ronald P. Uhlig, David J. Farber, James H. Bair, "The Office of the Future", *North–Holland Publishing Company*, 1979, pp. 206–225.

Robert Morris, Ken Thompson, " Password Security: A Case History", *ACM*, Nov. 1979, pp. 594–597.

James B. Rothnie, Jr., "Distributed DBMS no longer just a concept", *Data Communications*, Jan. 1980, pp. 61–67.

R. M. Needham, "User–Server Distributed Computing", *Distributed Computing Systems*, Sep. 1978, pp. 71–78.

Phillippe Penny, Arlette Ferrier, "Phlox2: A Distributed System Providing A Server Database Management System", *IEEE*, 1981, pp. 95–101.

Henry A. Lowe, " The Data Access Protocol: A Protocol for Remote File Access", *Proceedings, EURO IFIP 79*, Sep. 1979, pp. 659–666.

"Analyzing commodity futures with a micro", *Mini–Micro Systems*, Jan. 1979, pp. 81, 83.

"Data Processing System", *Mini–Micro Systems*, Jan. 1979.

"Now Digital's leadership in both terminals and computers brings single–vendor convenience to network information systems", *Mini–Micro Systems*, Mar. 1979.

"Think Ontel It's Intelligent", *Mini–Micro Systems*, Mar. 1979, pp. 103.

"Distributed Processing System", *Mini–Micro Systems*, Apr. 1979, pp. 108.

"NCC invades New York", *Mini–Micro Systems*, May 1979, pp. 111–114.

"Introducing the first intelligent terminal that's ready to do business", *Mini–Micro Systems*, May 1979.

Ronald Rosenberg, "A workstation for the OEM", *Mini–Micro Systems*, May 1979, pp. 171–172.

"Table of Small Business System Suppliers", *Mini–Micro Systems,* Jun. 1979, pp. 46–57, 106–107.

Merging Data Processing and Word Processing, *Mini–Micro Systems,* Jul. 1979, pp. 26, 31–32, 34, 38.

Thomas G. Viggers, "Which type of terminal is right for you?", *Mini–Micro Systems,* Jul. 1979, pp. 97–98, 100, 102–103.

"Information Management Systems", *Mini–Micro Systems,* Aug. 1979.

"Heath and MIT Developing Advanced 16–Bit Microcomputer System", *Mini–Micro Systems,* Oct. 1979, pp. 19.

Malcom L. Stiefel, "Surveying data base management systems", *Mini–Micro Systems,* Nov. 1979, pp. 94–104.

"Mini–Based MIS Network Aids Pro Football Coaches", *Mini–Micro Systems,* Dec. 1979, pp. 62, 64.

"Data General Corporation document", *Data General,* 1981, pp. 2–10.

D. W. Davies, E. Holler, E. D. Jensen, S. R. Kimbleton, B. W. Lampson, G. LeLann, K. J. Thurber, R. W. Watson, "Distributed Systems—Architecture and Implementation, An Advanced Course", *Springer–Verlag Berlin Heidelberg,* 1981.

Harvey M. Weiss, "The ORACLE data base management system," *Mini–Micro Systems,* Aug. 1980, pp. 111–114.

"Datapoint enhances office sustem with 16–bit processor", *Mini–Micro Systems,* Jan. 1981.

"Breakpoints," *Mini–Micro Systems,* Feb. 1981.

Cluster/One, "Enjoy Local Networking—Now!", Nestar Systems Inc., *Mini–Micro Systems,* Feb. 1981.

"New Systems," *Mini–Micro Systems,* Feb. 1981, pp. 186.

Datapoint, "Datapoint software is key to integrated office system," *Mini–Micro Systems,* Jan. 1980, pp. 26.

Hewlett–Packard, "H–P jumps into personal computer market," *Mini–Micro Systems,* Jan. 1980.

GenRad/Futuredata, "GenRed/Futuredata delivers Intel, Zilog, Motorola, Rockwell," *Mini–Micro Systems,* Jan. 1980, pp. 52–53.

Ronald Rosenberg, "Xerox regards Ethernet as an AT&T Alternative," *Mini–Micro Systems,* Feb. 1980, pp. 53–54.

"Breakpoints," *Mini–Micro Systems,* Jul. 1980, pp. 6.

"New Systems," *Mini–Micro Systems,* Apr. 1980, pp. 139.

"Minibits," *Mini–Micro Systems,* Apr. 1980, pp. 44.

T1–Score, "How T1–Score will score the bobsled," *Mini–Micro Systems,* Feb. 1980, pp. 121.

"Xerox, Intl and DEC join forces for local area network," *Mini–Micro Systems,* Jul. 1980, pp. 17, 20, 61–62.

Harvey Weiss, "QDMS brings data management to the masses," *Mini–Micro Systems,* Feb. 1981, pp. 178–179, 181, 183.

"Breakpoints," *Mini–Micro Systems,* Aug. 1980, pp. 5.

Lori Valigra, "Word–processing systems sport innovative features," *Mini–Micro Systems,* Aug. 1980, pp. 35, 37, 40, 42.

Malcolm L. Stiefel, "Intelligent terminals shift to 16–bit microprocessors," *Mini–Micro Systems,* Nov. 1980, pp. 97–98, 100–106.

"New Systems," *Mini–Micro Systems,* Nov. 1980, pp. 171.

Paul Kinnucan, "Competition heats up for local area networks," *Mini–Micro Systems,* Jan. 1981, pp. 14, 17.

"Laboratory mini aids fire research," *Mini–Micro Systems,* Sep. 1980, pp. 139–143.

"New Systems," *Mini–Micro Systems,* Sep. 1980, pp. 145.

"New Software," *Mini–Micro Systems,* Sep. 1980, pp. 168.

"Minibits," *Mini–Micro Systems,* Nov. 1980.

Stephen A. Caswell, "Microcommunications: an evolving bazaar," *Mini–Micro Systems,* Sep. 1980, pp. 110–112, 115, 117–118.

ADAM & LOMAC, "The Importance of Philosophy", *Logical Machine Corp.,* Nov. 1977.

LOMAC Distributor News, *Logical Machine Corp.,* Oct. 1977.

LOMAC Distributor News, *Logical Machine Corp.,* Sep. 1977.

LOMAC Distributor News, *Logical Machine Corp.,* Aug. 1977.

LOMAC Distributor News, *Logical Machine Corp.,* Jul. 1977.

LOMAC Distributor News, *Logical Machine Corp.,* Jun. 1977.

LOMAC Distributor News, *Logical Machine Corp.,* May 1977.

LOMAC Distributor News, *Logical Machine Corp.,* Apr. 1977.

LOMAC, "Logical passes milestone," *Logical Machine Corp.,* Oct. 1977.

LOMAC product news, "The Lomac Eve Data Entry System," *Logical Machine Corp.,* May 1977.

LOMAC product news, *Logical Machine Corp.,* Mar. 1977.

LOMAC product news, *Logical Machine Corp.,* Feb. 1977.

LOMAC product news, *Logical Machine Corp.,* Dec. 1976.

LOMAC, "Logical Laws, Accurate Axioms, Profound Principles, Trusty Truisms, Homey Homiles, Colorful Corollaries, Quotable Quotes & Rambunctious Ruminations," *Logical Machine Corp.,* 1976.

Bob Greene, "Campers: Meet Your New Companion," *Daily News Tribune,* Oct. 1977.

ADAM, "Computer Unveiling Scheduled," *Palm Beach Times,* Oct. 28, 1975.

John Peers, Gerald Horgan, Edmund C. Berkeley, "The First 'No Software' Computer: The ADAM System of John Peers & Company, Inc., " 1975.

ADAM, "The New Small Computers Sophisticated Users For First–Time Users," *The Research Institute of America, Inc.,* Jul. 1975.

Morris C. Klein, "Systems Casebook," The Smith Company, *Office News,* Oct. 1975.

"Small Business Computer News," *Management Information Corp.,* vol. 2 No. 7, Jul. 1975.

"Personal Computing Is ADAM the first of a new breed?", *Benwill Publishing Corp.,* May/Jun. 1977.

"Emerging Technologies," *Industry Week,* Jun. 23, 1975.

"Datapro mininews," Datapro Research Corp., vol. 3 No. 7, Jul. 1975.

Robert M. Patterson, "While others sell turnkey solutions, Adam learns applications on the job," Minicomputer News, *Benwill Publishing Corp.,* 1975.

Catherine Arnst, "'Adam' Uses English, Not Software," *Computerworld,* May 28, 1975.

Oliver Williams, *Daily Commercial News,* May 21, 1975.

ADAM, "Service Bureaus Control Your Destiny Again," *Computerworld,* May 14, 1975.

Office Product News, Apr. 1975.

ADAM, "No need for programming," *Computer Weekly,* Mar. 20, 1975.

ADAM, "'Adam' Works With Naive Users," *Computerworld,* Mar. 19, 1975.

Guy De Jonquieres, "Compter re–think confirmed by IBM," *Financial Times,* Mar. 14, 1975.

Peter D. Whitney, "The coming of the home computer," *S.F. Sunday Examiner & Chronicle,* Feb. 19, 1978.

Richard A. Shaffer, "Computers That Use Plain English Permit Vast New Applications," *The Wall Street Journal,* Mar. 27, 1978.

"Machine an ask to be taught,"*Financial Times,* Nov. 15, 1976.

ADAM, "New no-software computer makes dealer's life simpler," *4-13 Automotive News,* Apr. 11, 1977.

ADAM, "the bionic desk," *Logical Machine Corp.,* 1977.

Larry Clinton, Jr., "Home-Grown Home Computers," May/Jun. 1977, pp. 16.

Gordon Carlson, "We Can Program Our Own Small Business Computer," *Office Publications, Inc.,* Feb. 1978.

"Personal Computing Discovers World In Chip Techonlogy," Direct Marketing, Jan. 1978.

Bob Downing, "Your future hiking partner could be a computer," *Akron Beacon Journal,* Feb. 1975.

Peter N. Budzilovich, "Computerizing a small business?", *Computer Decisions,* Feb. 1978, pp. 42, 47.

Billy Skelton, "Whistling Up World Hot Lips Superstars—Jus Strummin'," *Jackson Clarion-Ledger,* Jun. 11, 1978.

Richard A. Shaffer, "Electronic Gadgets Than Can Talk, Spell May Open New Path for Consumer Goods," *Wall Street Journal—Western Edition,* Jun. 12, 1978.

Robin Ashton, "Swimming the Paperwork Seas: Computers for the Little Guy," *Institutions Volume Feeding*/Operations/Technology, Jun. 1, 1978, pp 51-54.

Paul Voakes, "Logical Step: Conversational Computers," *Palo Alto Times,* Jul. 11, 1978.

ADAM, "User Programming Harness Rapid Growth," *Modern Office Procedures,* Jul. 1978, col. 2, Par. 2, also "New Products", *San Jose News,* Jul. 13, 1978, and ADAM the Younger, "A New Computer System for Small Businesses," *Electronics of America,* Jul. 11, 1978.

Advertising fashions come and go, but Goodrich sticks to 'Goodrich style', *Industrial Marketing* Jul. 1978, pp. 76, 78, 82, etc.

"LOMAC, Byte Financing, Management Reorganized," *Computer Retailing,* Sep. 1978, and Logical Machine Corp., no title, *EDP Weekly,* Sep. 11, 1978.

Several articles re: Logical Machine Corp: *Television Digest;* Logical Machine Corp, "Logical Taps Brandt", *Computer Systems News;* Logical Machine Corporation, "Item No. 15813. New Desk Top Computer," *Electronics of America; Infosystems; The Office;* and *Infosystems,* all in Sep. 1978.

Gordon Carlson, "We Can Program Our Own Small Business Computer". Back side of page: "Computer Profiles," *Small Business Computers Magazine,* Sep. 1978.

Adam the Younger, "Computer Offers Low Price; Adapts to English Language," *Industrial Distributer News,* Oct. 1978.

Articles Regarding Logical Machine Corporation, Oct. 1978.

Ricard A. Shaffer, "Computers Using Plain English Permit Vast New Applications," *Computers and People,* Oct., 1978, p. 2, Paragraph 4.

Two articles regarding Logical Machine Corp; "Logical Machine Sued on Lomac Use", *Electronic News,,* and "Desktop Computer," *Semi-Weekly,* both Nov. 27, 1978.

Five articles regarding Logical Machine Corp: "Companies", *San Jose News;* untitled, *Industrial Distributor,* "Logical Machine Corp.", *Geyer's Dealer Topics,* "Logical Machine forms new holding company", *Minicomputer News,* and "Adam the Younger", *Geyer's Dealer Topics,* all articles in Dec., 1978.

"Easy Access: Computers That Use Plain English Open New Avenues", *The Wall Street Journal,* Jan. 2, 1979.

Articles regarding Logical Machine Corp: "Logical Machine Corp", *Mini-Micro Systems,* "Desk-top Computer", *The Office,* "Logical Reorganization," *Geyer's Dealer Topics,* "LOMAC Announces Reorganization," *Computer Retailing,* untitled, *Electronic News.*

Logical Machine Corp, "News & Comment—Low-cost CRTs at Info '78," *Computer Decisions,* Jan. 22, 1979, D222455-456; also includes *Computer Weekly,* Jan. 30, 1979.

"From DP to the Top," *Datamation,* Jan. 30, 1979.

Larry Lettieri, "Better, Faster Data Entry," *Computer Decisions,* Feb. 26, 1979.

"Machines That Hear and Understand," *Business Week,* Mar. 6, 1979.

Marcia Blumenthal, "Spirited Lomac President Likes The Excitement of Cliff-Hanging", *Computerworld,* Apr. 19, 1979.

Davis, Skaggs & Co., Inc., "A View of Emerging Technology Companies", *Wall Street Journal,* Apr. 16, 1979.

Robert C. A. Goff, M.D., "The Bedside Microcomputer in the Intensive Care Nursery", *Interface Age,* Jul. 1978, pp. 65-67.

"The Home Computer", *Northern California Retailer,* May 1978.

"The Personal Computer: Tool of the Future", *Women in Business,* Jun. 1978. pp. 6-8.

"Home-Computer Fad Grows", *Virginian Pilot,* Jul. 9, 1978.

"New Products", *San Jose News,* Jul. 13, 1978.

"Byte to Produce Tina Computer", *Computer Retailer,* Jul. 1978.

John Harrison, "I asked Bill Roger how he manages to sell so many Sol computers, here's his answer.", *Processor Technology Corporation.*

Jerry Drolt, John Cool, "The Business Fountain of Youth", *The Image Resource Report.*

Advertisement, "Introducing the Space Byte Modular Business Computer".

Christopher Menkin, "Computer Bugs", *Daily Commercial News,* Oct. 24, 1978.

"Timeshare Disk BASIC System for North Star", *Byte News,* Nov. 21, 1978.

Sharon Pitman, "Smaller firms are putting computers to work", *The Capital Times,* Nov. 21, 1978.

"Computers Meet Many Needs In Homes, Businesses", *Sacramento Bee,* Nov. 27, 1978.

"Here's Wishing You a Digital Christmas", *Datamation,* Nov. 27, 1978.

"Z-80/8080 Disassembler", *Interface Age,* Dec. 11, 1978.

"Entry level system adds word processing", *Minicomputer News,* Jan. 30, 1979.

Garland P. Asher, "Tandy Corporation", *The Wall Street Transcript,* Feb. 26, 1979.

Eric Benhamou, "Integrated Software Design For Z-Net, A Local Microcomputer Network", *IEEE,* 1981, pp. 397-403.

Mark R. Brown, Roderic G. G. Carrell, Norihisa Suzuki, "The Cedar DBMS: A Preliminary Report", *Xerox Palo Alto Research Center,* pp. 205–211.

Data Node, "Network Processing Products Description", *Data Node, Inc.,* Jul. 1981.

"Notes on Goliath error codes", *Logical Machine Corp.*

"Goliath Disk and Menory Exerciser Display Lines", *Logical Machine Corp.*

"Raytheon's plunge into word processing", *Business Week,* Dec. 12, 1977, pp. 5–6.

"When IBM is a low–priced entry", *Business Week,* Jul. 7, 1980, pp. 10–12.

Syntrex Inc. and Olivetti sign wide–range agreement, *PR Newswire,* Oct. 20, 1980, pp. 13–14.

Lexitron Corporation today introduced a powerful new family of text processors described as the "ultimate standa-lones,", *PR Newswire,* Jun. 30, 1981, pp. 19–20.

"DEC merges word and data processing", *Business Week,* Jun. 6, 1977, pp. 2–4.

Max Schindler, "CP/Net helps micros share peripherals", *Electronic Design,* Aug. 2, 1980, pp. 35.

Neil B. Cohen, Charles B. Haley, Scott E. Henderson, Chak L. Won, "Gemini—A Reliable Local Network", *Syntrex Inc.,* pp. 1–22.

James Schwabe, "Disk–file sharing simplifies big software projects", *Electronic Design,* Sep. 1, 1980, pp. 129–132.

Kit Menkin, "2nd Computer Faire Draws 14,000", *Northern California Electronic News,* Mar. 20, 1978.

Advertisement for ADAM from Logical Machine Corporation, *Minneapolis Tribune,* Apr. 14–19.

Article about ADAM from Logical Machine Corporation, *Modern Office Procedures,* Apr. 1978.

Article about Logical Machine Corporation, *St. Louis Globe Democrat,* Apr. 24, 1978.

John Foster, "Small business computer needs no programming knowledge", *Mart Magazine,* Apr. 1, 1978.

Lucinda Mattera, "Presettable timer will permit real–time counting", *Electronics,* May 11, 1978, Advertisement for ADAM from Logical Machine Corporation, *Modern Office Procedures,* May 1978.

John M. McGuire, "Answer Us, Adam," *St. Louis Post–Dispatch,* May 3, 1978.

"EDP Today: Computers Move Into the Office," *Modern Office Procedures,* May 1978, pp. 77–78, 80–81, 83–84, 86.

Drew Major, "Report of Energy Management Systems: An Intelligent Approach to Energy Conservation," Submitted to Dr. Paul Hedman, Chemical Engieering 510, Brigham Young University, Mar. 5, 1979.

"The Ethernet: A Local Area Network", *Digital Equiopment Corporation, Intell Corporation, Xerox Corporation,* Version 1.0, Sep. 30, 1980.

John F. Schoch and Jon A. Hupp, "Measured Performance of an Ethernet Local Network," *Xerox Palo Alto Research Center,* Feb. 1980.

Ronald C. Crane and Edward A. Taft, "Practical Considerations in Ethernet Local Network Design," *Xerox Systems Development Division and Palo Alto Research Center,* Oct. 1979, revised Feb. 1980.

Robert M. Metcalfe and David R. Boggs, "Ethernet: Distributed Packet Switching for Local Computer Networks," *The Ethernet Local Network: Three Reports, Xerox Palo Alto Research Center,* May 1975, reprinted Feb. 1980.

Ralph Mauriello, "A Distributed Processing System for Military Applications—Part 3: The Computers," *Computer Design,* Dec. 1980, pp. 22, 26, 30, 32, 36, 38.

Ralph Maruiello, A Distributed Processing System For Military Applications—Part 4: The Software, *Computer Design,* Jan. 1981, pp. 14, 19–20, 27–28, 30.

Series of Advertisements by Molecular Computer, including ads and specifications for InfiNET I and InfiNET II.

Advertisements for MuDOS™ "MuDOS™ Specifications", *MuSys Corporation.*

Advertisement for TeleVideo Systems, "The Computer Family—With a Growth Path . . . TeleVideo Systems" *Televideo Systems, Inc.*

"Addendum—COMDEX '81 Conference & Exposition".

Advertisement, Molecular Computer—n/STAR™.

Paula Hawthorn, "The Effect of Target Applications on the Design of Database Machines," *Lawrence Berkeley Laboratory, University of California,* Mar., 1981. (To be presented at the SIGMODE International Coference on Management of Data, Ann Arbor, MI, Apr. 29–30, 1981).

"Speech Recognition and Response Units Proliferate As Technology Approaches Maturity," *Data Processing Digest,* Nov. 27, 1978, [reprinted from] EDP Industry Report, vol. 14, Aug. 23, 1978, pp. 1–5.

Robert Epstein, "Why Database Machines?," *Datamation,* Jul. 1983, pp. 139–140, 144.

"Cluster/One User Manual," *Nestar Systems Incorporated,* 1979.

"Cluster/One"—Price List, *Nestar Systems Incorporated,* effective Feb. 1, 1980.

"Credit Appliation References List, Jan. 1980," *Nestar Systems, Incorporated,* 1980.

Advertisement, "PET Analog Input," *BYTE,* Jun. 1979, p. 233.

Olin Bray and Kenneth J. Thurber, "What's Happinging with Data Base Processors?", *Datamation,* Jan. 1979, pp. 146–148, 155–156.

Robert J. Williams, "The Distributed Intelligence System," *Society of Manufacturing Engineers,* 1976.

Advertisement, "It's Duck Soup!," *LOMAC—Logical Machine Corporation,* 1977.

Advertisement, "We have only 293 buttons left—Am I Proud!" *Logical Machine Corporation.*

Advertisement, "New York City Woman Writes: 'Never, Ever, Play Leapfrog With a Unicorn!'," Logical Machine Corporation, 1976.

Advertisement, "Not–so–ridiculous–as–it–seems Fre Offer Advertisement," Logical Machine Corporation, 1977.

Advertisement, "It's Easy as Pie!" Logical Machine Corporatin, 1977.

Advertisement, "It's Easy as Falling Off a Log!" Logical Machine Corporations, 1977.

Advertisement, "The Bionic Desk—a world's first" Logical Machine Corporation, 1977.

Advertisement, "The 'Honest' One—the World's First Authentic Program–it–yourself Computer," Logical Machine Corporation.

Ben Hawkins, "Foreign Language Flows From Adam," *Sunday Mercury News,* Jul. 24, 1977.

Advertisement, "(1st in a series of advertisements promoting the simple philosophies of life)," *Logical Machine Corporation,* 1976.

Advertisement, "The trouble with Bringing Out a Great New Product, You Have a—of a Time Getting People to Read About It," Logical Machine Corporation, *Business Week,* Jun. 28, 1976, p. 18 C–P.
Advertisement, "[Logical Machine Corporation Wades Knee–deep into Muddy Waters; First in a Series of Business Service Advertisements]—Some Logical Talk for Executives Befuddled by the Claims to Computer Manufacturers," Logical Machine Corporation, 1975.
Advertisement with article: "Financial Times Reports on a Revolutionary Programmer–less Business Computer System from Logical Machine Corporation," The Financial Times, Monday, Nov. 15, 1976.
LOMAC ADAM: "New No–software Computer Makes Dealer's Life Simpler," *Automotive News,* Apr. 11, 1977.
Advertisement, "Handy Requirement Check List for Future Computer Buyers or Disenchanted Computer Owners," Logical Machine Corporation, 1977.
Data Node I, "Hardware Spotlight—Micro/Mini Network," *Datamation,* Sep., 1980.
"LOMAC Distributer News, Special Edition No. 1," *Logical Machine Corporation*.
R.F. Thomas, R.J. Ridge, et. al., "Computing in Support of Experiments at LAMPF," Informal Report, *Los Alamos Scientific Laboratory,* Oct. 1976.
David K. Hsiao, "Data Base Computers," *Advances in Computers,* vol. 19, 1980.
George A. Champine, "Four Approaches to a Data Base Computer," *Datamation,* Dec. 1978, pp. 101–106.
T. Ideguchi, T. Mizuno, H. Matsunaga, "The Distributed Minicomputer Netowrk, Its Implementation and Evaluation," *International Journal of Mini and Microcomputers,* vol. 2, No. 2, 1980, pp. 23–29.
Y. Edmund Lien and John H. Ying, "Design of a Distributed Entity–Relationship Database System", *IEEE,* 1978, pp. 277–282.
Kenneth J. Thurber, "Computer Communication Techniques," *IEEE,* 1978, pp. 589–594.
FRA Hopgood, "Practical Aspects of Current Distributed Computing Research," *Rutherford Laboratory, UK,* pp. 225–236.
Jeremy Dion, "The Cambridge File Server," *University of Cambridge Computer Laboratory,* pp. 26–35.
Bernard P. Wess, Jr., "Distributed Computer Networks in Support of Complex Group Practices," IEEE, 1978, pp. 469–477.
E.B. Spratt, "The Cambrdge Ring," *Electronic Technology,* vol. 14, Nov./Dec., 1980, pp. 219–223.
H. Jafari, J. Spragins,and T. Lewis, "A New Modular Loop Architecture for Distributed Computer Systems," *IEEE,* 1978, pp. 72–77.
W. Morven Gentleman and J.E. Corman, "Design Considerations for a Local Area Network Connecting Diverse Primitive Machines," *Local Networks for Computer Communications,* 1981, pp. 207–221.
Peter T. Kirstein, Steve R. Wilbur, "University College London Activities with the Cambridge Ring," *Local Netowrks for Computer Communications,* 1981, pp. 107–124.
V. Bruce Hunt, "Olivetti Local Network System Protocol Architecture," *Local Networks for Computer Communications,* 1981, pp. 223–244.
Charles Bachman and Mike Canepa, "The Session Control Layer of An Open System Interconnection," *IEEE,* 1978, pp. 150–156.
David K. Hsiao, Stuart E. Madnick, "Database Machine Architecture in the Context of Information Technology Evolution," 1977, pp. 63–82.
Ken Hardwick and William Federbusch, "Local Networking: The Mission Link Emerges," 1980.
"News Briefs: Xerox Introduces Ethernet–compatible Office Gear," *Electronics,* Dec. 4, 1980.
Advertisement, "Two Free Trial Offers—and One that Costs you a Buck," Tandy, Atari, Compuserve.
"Interactive Software Links HP 3000, IBM Mainframe," *BYTE—Computer Advances,* Aug. 1980.
"What's New?" *Byte,* Dec. 1979.
"What's New—Distributed Computer Systems Based on Personal Computers?" *BYTE*.
"NCC Draws Big in the Big Apple," News in Perspective, *Datamation,* Jul., 1979, pp. 52–60.
"IDM—The Intelligent Database Machine," (Exhibit 391A).
Advertisement, "DBMS In a Box," *Britton Lee, Inc*.
"Computers & Peripherals—Processor Does Data–base Tasks," *Electronics,* Apr. 24, 1980, pp. 220, 222.
Advertisement, "Goliath," *Logical Machine Corporation*.
Advertisement, "Tina . . . Goliath . . . David," *Logical Macine Corporation*.
Manual, "Goliath," *Logical Business Machines*.
Adam Osborne, "From the Fountainhead," *Interface Age,* Jul. 1978, pp. 43–45.
Paul Neuman and Ray Lewis, "Computer Stores Offer a Challenge to Established Office Macine Dealers," *Geyer's Dealer Topics,* Jul. 1978.
"Hot Market Exists for Newest Hobby . . . Home Computers," *Topeka Daily Capital,* Jun. 28, 1978, p. 15.
"Computers Are Popular for Home Amunsement," *Norwich Bulletin,* Jul. 28, 1978.
Several articles re: BYTE Industries: "Company Looking for Private Lable Microprocessor Products," *Electronics of America;* "Time–Share System," Jul. 1978; "Byte Receives Certification," Jun. 12, 1978; "Byte to Produce Tina Computer," Jul. 1978.
Advertisement, "I asked Bill Rogers How He Manages to Sell So Many Sol Computer. Here's His Answer."
Advertisement, "Introducing the Space Byte Modular Business Computer," *The Space Byte Computer Corporation*.
Blanding Clarkson, "Home Computers: How Soon Will You Own an R2–D2 or C3P–0?", *Charlotte Magazine,* Aug., 1978.
Christopher Menkin, "Business Beat—Electronic Wizardry," *Daily Commercial News,* Sep. 12, 1978.
Two Articles: "Northshare," *Interface Age,* Mar. 13, 1979, and Bill Langenes, "Maybe Computer Stores ARE Sandwich Shops (And Everyone is Taking a Bite of Their Action)," *Computer Retailing,* Mar. 13, 1979.
"Byte Plans National Print, Broadcast effort," *Advertising Age,* Apr. 16, 1979.
Jeffrey Beeler, "Cambridge Unveils 370–Type CPUs," *Computerworld,* Aug. 28, 1978, p. 1, 6.
"Data–Byte System 1," *Billings Computer Corporation*.
"Burroughs Network Architecture—a major advance in networking Capability—Broadens the Effectiveness of Computers Interacting with One Another," *Burroughs Clearing House,* p. 26–27.
P.T. Barry, "The Regional Computing Organisation Network," *The Computer Journal,* vol. 21, No. 2, pp. 184–187.
Kenneth J. Thurber, "Computer Communication Techniques," IEEE, 1978, pp. 589–594.

Glen Horton, "Distributed Network," *BYTE,* Nov. 1978, pp. 62–64.

"Technical Literature: Distributed Processing Networks or LANs," *Technology Applications Center, NASA/UK TAC.*

Roger Allan, Local–net Architecture, Protocol Issues Heating Up, *Electronic Design,* Apr. 16, 1981, pp. 91–95.

"New Systems," *Mini–Micro Systems,* Jan. 1979.

"Z–Lab Links Development Stations on Znet," *Computerworld,* Oct. 4, 1980.

Marcia Bloomenthal, "Basic Four System Meshes DP, WP Functions," *Computerworld,* Oct. 13, 1980, p. 13.

Fred Maryanski, Paul Fisher, Virgil Wallentine, "Evaluation of conversion to a back–end data base management system," Computer Science Department, Kansas State University, pp. 293–297.

Nestar Systems, Incorporated, Cluster/One Model A (™), Technical Note 4 (Rev. 0), "Summary of space requirements for NFS tables Release 1.0 and Release 1.1", Feb. 11, 1981, pp. 1–2.

Nestar Systems, Incorporated, Cluster/One Model A (™), Technical Note 6 (Rev. 0), "ClusterBus Cabling Information", Feb. 19, 1981, pp. 1–5.

Nestar Systems, Incorporated, Cluster/One Model A Network Support Programs, "Printer Spooler, version 1.0", Aug. 20, 1980, pp. 1–7.

Nestar Systems, Incorporated, Cluter/One Model A Network Support Programs, "Network Interface Routines, version 1.0", Aug. 20, 1980, pp. 1–6.

Nestar Systems, Incorporated, Cluter/One Model A Network Support Programs, "Directory List Program, version 1.0", Aug. 20, 1980, pp. 1–2.

Nestar Systems, Incorporated, Cluster/One Model A Network Support Programs, "Simple File Card Handler, version 1.0", Aug. 20, 1980, pp. 1–4.

Nestar Systems, Incorporated, Cluster/One Model A Network Support Programs, "Nestar Mail System, version 1.2", (DRAFT) Aug. 20, 1981, pp. 1–7.

Nestar Systems, Incorporated, Cluster/One Model A Network Support Programs, "Talk Program, version 1.0", Aug. 20, 1980, pp. 1–3.

Nestar Systems, Incorporated, Cluster/One Model A Network Support Programs, "Startup Command File, version 1.0", Aug. 20, 1980, pp. 1–2.

David J. DeWitt, "Query Execution in Direct", pp. 1–24.

Michael Hammer, Bahram Niamir, "A Heuristic Approach to Attribute Partitioning", pp. 1–31.

L. Slotnick, "Logic per Track Devices", pp. 291–296.

David Boggs, Gene McDaniel, Dan Swinehart, "The Woodstock File System" (slides), Xerox Palo Alto Research Center, pp. 1–13.

"Britton sees the computer as just another peripheral", Electronics, Apr. 24, 1980, pp. 14, 16.

Edward K. Yasaki, "OEMS find uses for data box", Datamation, Mar. 1982, pp. 63, 66, 68, 71.

"Bringing data–base management up to date", Electronics, Mar. 10, 1981, p. 163.

"Machine helps cigarette maker manage lab data", Computerworld (special report), Jun. 24, 1985, pp. 8–9.

Betsy Gilbert, "The computer connection—local networks", Personal Computing, Dec. 1981, pp. 26–29, 73.

Edward P. Striiter, Leonard J. Shustek, "Local network links personal computers in a multiuser, multifunction system", Electronics, Jun. 16, 1981, pp. 171–175.

"The cluster/one is more than a network", Nestar, 1981.

"Distributed Computer System Based on Personal Computers", Byte, 1979, p. 216.

"Micro Node Basic Reference Guide", Data Node.

"VT100 Micro Node Installation Manual", Data Node, pp. 1–14.

Nestar Systems, Incorporated, Cluster/One Model A (™), Technical Note 5 (Rev. 0), "NETLINK Version 1.0", Feb. 11, 1981, pp. 1–2.

Deposition of Roger E. Billings, with Exhibits, Monday, May 11, 1992, vol. 1, pp. 1–171, 179–205.

Deposition of Roger E. Billings, vol. II, pp. 206–421, Tuesday, May 12, 1992.

Deposition of Roger E. Billings, vol. III, Tuesday, Sep. 29, 1992.

Deposition of Roger E. Billings, vol. III, Tuesday, Sep. 29, 1992, Exhibits Only, Section 1, Exhibits 1–3.

Deposition of Roger E. Billings, vol. III, Tuesday, Sep. 29, 1992, Exhibits Only, Section 2, Exhibits 4–8.

Deposition of Roger E. Billings, vol. III, Tuesday, Sep. 29, 1992, Exhibits Only, Section 3, Exhibit 9.

Deposition of Roger E. Billings, vol. IV, Wednesday, Sep. 30, 1992.

Deposition of Roger E. Billings, vol. V, pp. 130–318, Tuesday, Jan. 5, 1993.

Deposition of Roger E. Billings, vol. VI, pp. 319–504, Wednesday, Jan. 6, 1993.

Deposition of Roger E. Billings, vol. VII, pp. 505–536, Thursday, Jan. 7, 1993.

Deposition of Roger E. Billings, vol. VII, pp. 537–754, Monday, Feb. 1, 1993, Exhibits Only.

Deposition of Roger E. Billings, vol. VII, pp. 537–754, Monday, Feb. 1, 1993.

Deposition of Roger E. Billings, vol. IX, pp. 755–976, Tuesday, Feb. 2, 1993.

Deposition of Roger E. Billings, vol. IX, pp. 755–976, Tuesday, Feb. 2, 1993, Exhibits Only.

Deposition of Roger E. Billings, vol. X, pp. 977–1215, Wednesday, Feb. 3, 1993.

Deposition of Roger E. Billings, vol. X, pp. 977–1215, Wednesday, Feb. 3, 1993, Exhibits Only.

Deposition of Roger E. Billings, vol. XI, pp. 1216–1400, Thursday, Feb. 4, 1993.

Deposition of Roger E. Billings, vol. XI, pp. 1216–1400, Thursday, Feb. 4, 1993, Exhibits 33–35.

Deposition of Roger E. Billings, vol. XII, pp. 1401–1604, Friday, Feb. 5, 1993.

Deposition of Roger E. Billings, vol. XII, pp. 1401–1604, Friday, Feb. 5, 1993, Exhibits 36–38.

Continued Deposition of Roger E. Billings, vol. 13,, pp. 1608–1825, Wednesday, Jan. 12, 1994.

Continued Deposition of Roger E. Billings, vol. 14, pp. 1826–2065, Thursday, Jan. 13, 1994 with Exhibits.

Declaration of Roger E. Billings in Opposition to Motion for Summary Judgment; Aug. 13, 1993.

Declaration of Hai–Yann Hwang in Opposition to Motion for Summary Judgment; Aug. 13, 1993.

Deposition of Hai–Yann Hwang; vol. I; Mar. 21, 1994; pp. 1–194.

Deposition of Hai–Yann Hwang; vol. II; Mar. 22, 1994; pp. 195–373.

Deposition of Hai–Yann Hwang; vol. III; Mar. 23, 1994; pp. 374–538.

Deposition of Hai–Yann Hwang; vol. IV; May 2, 1994; pp. 539–693.

Exhibits to vol. IV to the Deposition of Hai–Yann Hwang; May 2, 1994.

Deposition of Hai–Yann Hwang; vol. V; May 3, 1994; pp. 695–901.

Declaration of Philip H. Reagan in Opposition to Motions by Novell for Summary Judgment; Jul. 8, 1994.

R.H. Canaday, R.D. Harrison, E.L. Ivie, J.L. Ryder and L.A. Wehr, "A Back–end Computer for Data Base Management," Communications of the ACM, vol. 17, No. 10 (Oct. 1974): 575–582.

Thomas Marill and Dale Stern, "The datacomputer—A network data utility," AFIPS Conference Proceedings, *1975 National Computer Conference,* (May 19–22, 1975): 389–395.

Fred J. Maryanski, Paul S. Fisher, Virgil E. Wallentine, and Myron A. Calhoun, "A Minicomputer Based Distributed Data Base System" IEEE Trends and Applications Symposium on Micro and Mini Systems, (May 1976): 113–117.

David Hsiao and Stuart Madnick, "Database Machine Architecture in the Context of Information Technology Evolution," Proceedings of the Third International Conference on Very Large Data Bases, (Oct. 6–8, 1977): 63–84.

Eugene Lowenthal, "Data Base Processors: What Can They Do?". Computerworld, (Jun. 4, 1979): In Dept/1 to In Depth/12.

Fred J. Maryanski, Paul S. Fisher, Richard D. Housh, and David A. Schmidt, "A Prototype Distributed DBMS," Hawaii International Conference on System Sciences, (Jan. 1979): vol. 2: 205–214.

Joseph J. Passafiume, "Providing Network Data Servies Using a Backend Data Base Machine," IEEE Proceedings of Spring 1980 Compcon (Feb. 1980), 251–262.

Beatrice Del Vecchio, Philippe Penny, "The PHLOX Project: Three Data Bases Management Systems for Micro–Computers," Proceedings of the Third Symposium on Small Systems, ACM SIGSMALL Newsletter, (Palo Alto, CA, Sep. 1980), 173–178.

"IDM 500 Intelligent Database Machine Product Description," Britton–Lee, Inc., (1980).

"Hardware Spotlight—Micro–Mini Network," Datamation (Sep. 1980), 230.

Apple LCN from Zynar, Electronic Technology, (Nov./Dec. 1980), 223.

Andrew S. Tanenbaum, "Computer Networks," Prentice–Hall, (Dec. 1980).

Roger E. Billings and Robert J. Ridge, "Billings Distributed Processing Network—Distributed Data Processing Using Functionally Structured Distribution," Computer Progress, (Spring 1982), 13–19.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–14 are cancelled.

* * * * *